United States Patent [19]
Sato et al.

[11] Patent Number: 4,556,632
[45] Date of Patent: Dec. 3, 1985

[54] COLOR LIGHT-SENSITIVE MATERIAL

[75] Inventors: Kozo Sato; Shinsaku Fujita; Koichi Nakamura; Hideki Naito, all of Kanagawa, Japan

[73] Assignee: Fuji Photo Film Co., Ltd., Kanagawa, Japan

[21] Appl. No.: 663,631

[22] Filed: Oct. 22, 1984

[30] Foreign Application Priority Data

Oct. 27, 1983 [JP] Japan ................. 58-201998

[51] Int. Cl.$^4$ .................. G03C 1/40; G03C 5/54
[52] U.S. Cl. ................... 430/562; 430/222; 430/223
[58] Field of Search ................. 430/222, 223, 562

[56] References Cited

U.S. PATENT DOCUMENTS 4,273,708  6/1981  Kilminster et al. ............... 430/223
4,358,526  11/1982 Fujita et al. ..................... 430/223
4,473,631  9/1984  Hirai et al. ...................... 430/223

FOREIGN PATENT DOCUMENTS 0066227  6/1978  Japan ................. 430/223

Primary Examiner—Richard L. Schilling
Attorney, Agent, or Firm—Sughrue, Mion, Zinn Macpeak & Seas

[57] ABSTRACT

A color light-sensitive material is described, comprising a support and at least one light-sensitive silver salt layer on the support, wherein the layer contains a dye-providing compound represented by the general formula (I):

$$(\text{Dye-X})_g\text{-Y} \quad (\text{I})$$

wherein all the symbols are as defined in the appended claims. This dye-providing compound provides a color image which is sharp and further is superior in light fastness.

18 Claims, No Drawings

COLOR LIGHT-SENSITIVE MATERIAL

FIELD OF THE INVENTION

The present invention relates to a novel cyan azo dye-providing compound and a color light-sensitive material containing the compound.

BACKGROUND OF THE INVENTION

A color diffusion transfer photographic process is well known which utilizes an azo dye-providing compound releasing an azo dye as a result of development under basic conditions, with the azo dye having a different diffusibility from that of the azo dye-providing compound itself. Dye-providing compounds releasing a cyan dye, for example, are described in U.S. Pat. Nos. 3,942,987, 4,013,635, 4,273,708, 4,268,625 and Japanese Patent Application (OPI) No. 143323/78 (the term "OPI" as used herein refers to a "published unexamined Japanese patent application").

All the compounds described in the foregoing references have a nitro group in the para-position to the azo group and it is known that they are subject to discoloration through reduction of the nitro group during the developing process. Moreover, in general, azo dyes having a nitro group necessarily provide images inferior in light fastness because of their light reducing properties.

It is sometimes observed that the dye-providing compounds, when incorporated into the same layer as a light-sensitive silver halide emulsion, inhibit development of the silver halide. This is assumed to be ascribable to the presence of the nitro group.

Japanese Patent Application (OPI) No. 66227/78 discloses cyan azo dye-providing compounds having a trifluoromethanesulfonyl group in the para-position to the azo group. These compounds, however, have disadvantages relating to synthesis and pollution since they contain fluorine. In addition, they require improvement in the sharpness of hue and diffusibility of dye released.

British Pat. No. 1,490,248 and Japanese Patent Application (OPI) No. 40402/80 disclose magenta azo dye-providing compounds with a diazo component having a plurality of alkylsulfonyl groups. All the compounds are unsubstituted or substituted by an electron attractive group in the 2-position of naphthol and, therefore, their absorption peaks are present at such short wavelengths that they cannot be used as cyan dye-providing compounds.

Until now, no cyan dye-providing compound apart from those having a nitro or trifluoromethanesulfonyl group in the para-position to the azo group has been known.

SUMMARY OF THE INVENTION

An object of the present invention is to provide a dye-providing compound which releases a beautiful cyan dye.

Another object of the present invention is to provide a compound capable of forming an image superior in light fastness.

Still another object of the present invention is to provide a dye-providing compound which does not inhibit development of silver halide.

Still another object of the present invention is to provide a dye-providing compound which is stable during storage and the process of development.

Still another object of the present invention is to provide a color light-sensitive material which produces a cyan image superior in light fastness and hue.

It has been found that these and other objects of the present invention can be attained by a novel azo dye-providing compound represented by the following general formula (I), and by a color light-sensitive material having at least one light-sensitive silver salt layer which contains a dye-providing compound represented by general formula (I):

$$(Dye-X)_q-Y \qquad (I)$$

wherein:

Dye is a cyan dye or dye precursor represented by the following general formula (II);

X is a bonding or connecting group;

Y is a group which releases Dye in a positive or negative relation to a latent image imagewise formed in the light-sensitive silver salt layer, the diffusibility of the Dye released being different from that of the compound of general formula (I);

q is 1 or 2, and when q is 2, (Dye-X) may be the same or different; and

Dye is linked to X through any one of A, $B^1$, $B^2$, $B^3$, $B^4$, $B^5$, E, G and J of the following general formula (II):

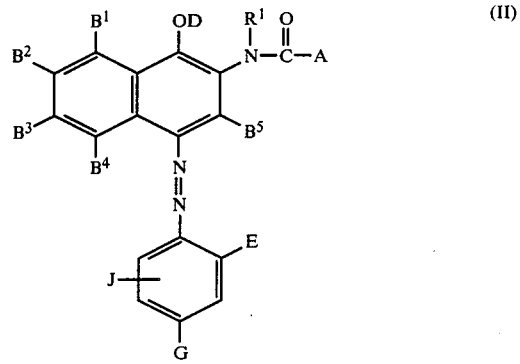

wherein:

A is a bond, a hydrogen atom, an alkyl group, a substituted alkyl group, an aryl group, a substituted aryl group, a heterocyclic group, or an

group (wherein $A^2$ and $A^3$ may be the same or different, and are each the same as defined for A);

$B^1$, $B^2$, $B^3$, $B^4$ and $B^5$ may be the same or different, and are each a bond, a hydrogen atom, an alkyl group, a substituted alkyl group, a halogen atom,

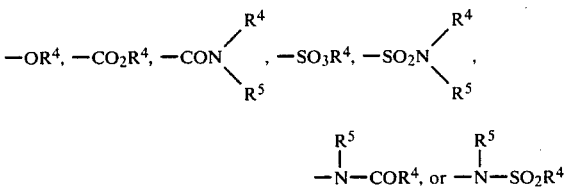

(wherein $R^4$ and $R^5$ may be the same or different, and are each a hydrogen atom, an alkyl group, a substituted alkyl group, an aryl group, or a substituted aryl group, and may combine together to form a 5- or 6-membered ring);

D is a hydrogen atom or a group capable of reacting to form an $O^-$ ion which is released under the action of a nucleophilic reagent;

E and G may be the same or different and are each a bond, an alkylsulfonyl group, a substituted alkylsulfonyl group, a phenylsulfonyl group, a substituted phenylsulfonyl group, or a cyano group, wherein the substituent includes

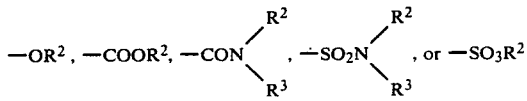

(wherein $R^2$ and $R^3$ are each a hydrogen atom, an alkyl group, or an aryl group);

J is a hydrogen atom, a halogen atom or a cyano group; and $R^1$ is a hydrogen atom, an alkyl group or a substituted alkyl group.

DETAILED DESCRIPTION OF THE INVENTION

The connecting group X is selected from the group consisting of $-NR^6-$ (wherein $R^6$ is a hydrogen atom, an alkyl group, or a substituted alkyl group), $-SO_2-$, $-CO-$, an alkylene group, a substituted alkylene group, a phenylene group, a substituted phenylene group, a naphthylene group, a substituted naphthylene group, $-O-$, $-SO-$, or a group derived by combining together two or more of the foregoing groups. Preferred examples are $-NR^6-SO_2-$, $-NR^6-CO-$, and $R^7-(L)_k-(R^8)_l-$ (wherein $R^7$ and $R^8$ are each an alkylene group, a substituted alkylene group, a phenylene group, a substituted phenylene group, a naphthylene group, or a substituted naphthylene group; L is $-O-$, $-CO-$, $-SO-$, $-SO_2-$, $-SO_2NH-$, $-NHSO_2-$, $-CONH-$, or $-NHCO-$; k is 0 or 1; and l is 1 when k=1 and 1 or 0 when k=0).

In addition, a combination of $-NR^6-SO_2-$ or $-NR^6-CO-$ and $-R^7-(L)_k-(R^8)_l-$ are preferably used.

Examples of $R^1$ and $R^6$ include a hydrogen atom, a lower alkyl group having from 1 to 4 carbon atoms, and a substituted alkyl group having from 1 to 4 carbon atoms (in which the substituent includes a halogen atom, a hydroxyl group, an alkoxyl group, and a cyano group). Particularly preferred is a hydrogen atom.

Preferred examples of $R^7$ and $R^8$ include an alkylene group having from 1 to 6 carbon atoms, a substituted alkylene group having from 1 to 8 carbon atoms (in which the substituent includes an alkyl group, an alkoxyl group, a hydroxyl group, a halogen atom, and a cyano group), a phenylene group (which may be linked at any of ortho-, meta- and para-positions), a substituted phenylene group having from 6 to 10 carbon atoms (in which the substituent includes an alkyl group, an alkoxyl group, a substituted alkoxyl group, a halogen atom, a substituted alkyl group, a hydroxyl group, a carbonyl group, a sulfamoyl group, a substituted sulfamoyl group, an alkylsulfonylamino group, a sulfamido group, or a substituted sulfamido group), a naphthylene group, and a substituted naphthylene group having from 10 to 14 carbon atoms (in which the substituent includes those described for the substituted phenylene group).

Preferred examples of E and G include an alkylsulfonyl group having from 1 to 6 carbon atoms, a substituted alkylsulfonyl group having from 1 to 6 carbon atoms (in which the substituent includes an alkoxyl group), a phenylsulfonyl group, a substituted phenylsulfonyl group (in which the substituent includes an alkyl group, an alkoxyl group, and a halogen atom), and a cyano group.

Examples of D include a hydrogen atom, a chlorine atom, a bromine atom, and a cyano group. A hydrogen atom is preferred from the viewpoint of sharpness of hue, and a chlorine atom, a bromine atom and a cyano group are preferred from the viewpoint of light fastness. Preferred examples of D include a hydrogen atom, an acyl group having from 1 to 18 carbon atoms, an alkyl group having from 1 to 16 carbon atoms, an arylsulfonyl group, and a phosphoryl group represented by

(wherein $R^9$ is an alkyl group having from 1 to 12 carbon atoms, an alkoxyl group having from 1 to 12 carbon atoms, a phenyl group, a phenoxy group, or a substituted phenoxy group having from 6 to 10 carbon atoms).

The structural feature of the dye-providing compounds represented by general formulae (I) and (II) is that they have an acylamino group

in the 2-position of the coupling component (1-naphthol), which changes the hue to appear at much longer wavelengths. Thus, a cyan dye can be obtained even with a diazo component not having a nitro group or a trifluoromethanesulfonyl group. Incorporation of the acylamino group in the 2-position has the additional advantages that the hue is shifted to the longer wavelength side, the hue is sharp (i.e., the absorption spectrum is very narrow) and light fastness is increased. These results are neither disclosed nor suggested in the literature and are new and unexpected.

In general, introduction of an electron donative group into a coupling component results in an increase in the pKa of a hydroxyl group of the dye and thus the hue of the dye becomes unstable. In the compounds of the present invention, the pKa is little affected even though an electron donative acylamino group is introduced, and the hue is stable, which is also an unexpected result.

More preferred examples of the cyan azo dye-providing compounds of the present invention are those in which $R^1$ and D of the general formula (II) are hydrogen atoms. More preferred are those represented by the following general formulae (IA) and (IB):

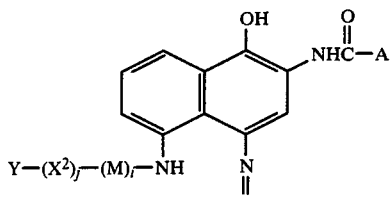

(IA)

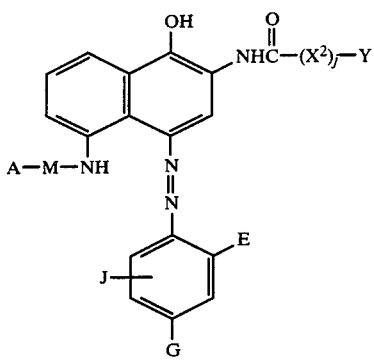

(IB)

wherein M is —SO₂— or —CO—; $X^2$ is —$R^3$—(L—)$_k$—($R^4$)$_l$— (wherein $R^3$, L, $R^4$, k and l are the same as defined above); and i and j are each 0 or 1.

In one embodiment, the compound of general formula (I) is a nondiffusible dye-providing compound which is oxidized as a result of development, thereby undergoing self-cleavage and releasing a diffusible dye.

An example of Y which is effective for compounds of this type is an N-substituted sulfamoyl group, such as for example, a group represented by general formula (III):

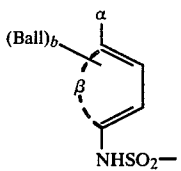

(III)

wherein Ball is a ballast group, β is a non-metallic atomic group necessary for forming a benzene ring, which may be condensed with a carbon ring or a hetero ring, forming, for example, a naphthalene ring, a quinoline ring, a 5,6,7,8-tetrahydronaphthalene ring, or a chroman ring. The benzene ring and the rings derived by condensation of the benzene ring with the carbon ring or hetero ring may be substituted by, for example, a halogen atom, an alkyl group, an alkoxyl group, an aryl group, an aryloxy group, a nitro group, an amino group, an alkylamino group, an arylamino group, an amido group, a cyano group, an alkylmercapto group, a keto group, a carboalkoxy group or a heterocyclic group.

α in general formula (III) represents —$OG^{11}$ or —$NHG^{12}$, wherein $G^{11}$ is a hydrogen atom or a group forming a hydroxyl group upon hydrolysis, and is preferably a hydrogen atom

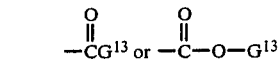

(wherein $G^{13}$ is an alkyl group, especially an alkyl group having from 1 to 18 carbon atoms, such as a methyl group, an ethyl group, or a propyl group; a halogen substituted alkyl group having from 1 to 18 carbon atoms, such as a chloromethyl group or a trifluoromethyl group; a phenyl group, or a substituted phenyl group), $G^{12}$ is a hydrogen atom, an alkyl group having from 1 to 22 carbon atoms, or a hydrolyzable group. Preferred examples of the hydrolyzable group of $G^{12}$ are

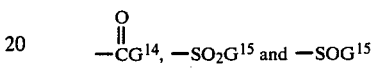

(wherein $G^{14}$ is an alkyl group having from 1 to 4 carbon atoms, such as a methyl group, a halogen substituted alkyl group, such as a mono-, di- or trichloromethyl group and a trifluoromethyl group; an alkylcarbonyl group, such as an acetyl group; an alkyloxy group; a substituted phenyl group, such as a nitrophenyl group and a cyanophenyl group; a phenyloxy group which may be unsubstituted or substituted with a lower alkyl group or a halogen atom; a carboxyl group; an alkyloxycarbonyl group; an aryloxycarbonyl group; an alkylsulfonylethoxy group; or an arylsulfonylethoxy group, and $G^{15}$ is a substituted or unsubstituted alkyl group or an aryl group).

In general formula (III), b is 0 or an integer of 1 or 2, when α is —$NHG^{12}$ and $G^{12}$ is an alkyl group which makes the compound of general formula (III) immobile and nondiffusing. When α is —$OG^{11}$ or α is represented by —$NHG^{12}$ and $G^{12}$ is a hydrogen atom, an alkyl group having from 1 to 8 carbon atoms, or a hydrolyzable group, b is 1 or 2 and preferably 1.

Representative examples of Y of the type illustrated by general formula (III) are described in Japanese Patent Application (OPI) Nos. 33826/73 and 50736/78.

When the compound of formula (I) is a nondiffusible dye-providing compound which oxidizes as a result of development to cleave and release a diffusible dye, Y can also be a group represented by the following general formula (IV):

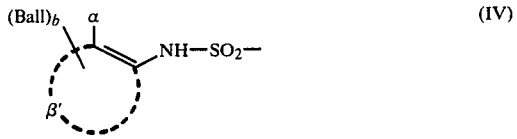

(IV)

wherein Ball, α, and b are the same as defined in the general formula (III); and β' is an atomic group necessary for forming a carbon ring, including a benzene ring. The benzene ring may be condensed with a carbon ring or a hetero ring, thereby forming, for example, a naphthalene ring, a quinoline ring, a 5,6,7,8-tetrahydronaphthalene ring, or a chroman ring. These rings may be further substituted with, for example, a halogen atom, an alkyl group, an alkoxyl group, an aryl group, an aryloxy group, a nitro group, an amino group, an alkylamino group, an arylamino group, an amido group, a cyano group, an alkylmercapto group, a keto group, a carboalkoxyl group, or a heterocyclic group.

Representative examples of Y of the type illustrated by general formula (IV) are described in Japanese Patent Application (OPI) Nos. 113624/76, 12642/81, 16130/81, 16131/81, 4043/82, 650/82, and U.S. Pat. No. 4,053,312.

Another example of Y which is suitable for nondiffusible compounds which react to release a diffusible dye described above is represented by the following general formula (V):

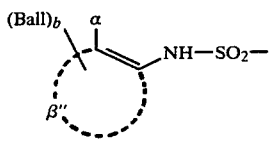
(V)

wherein Ball, α, and b are the same as defined in the general formula (III); and β" is an atomic group necessary for forming a hetero ring such as a pyrazole ring or a pyridine ring, which may be condensed with a carbon ring or a hetero ring. These rings may be further substituted with the same substituents as described in the general formula (IV).

Representative examples of Y of the type illustrated by general formula (V) are described in Japanese Patent Application (OPI) No. 104343/76.

Another example of Y which is suitable for nondiffusible compounds which release a diffusible dye described above is a group represented by the following general formula (VI):

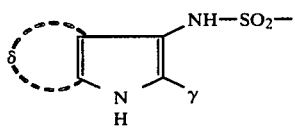
(VI)

wherein γ is preferably a hydrogen atom, a substituted or unsubstituted alkyl, aryl or heterocyclic group, or —CO—$G^{21}$, (wherein $G^{21}$ is

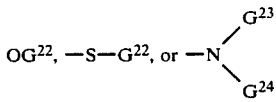

(wherein $G^{22}$ is a hydrogen atom, or a substituted or unsubstituted alkyl, cycloalkyl or aryl group, $G^{23}$ is the same as $G^{22}$ or an acyl group derived from an aliphatic or aromatic carboxylic acid or sulfonic acid, and $G^{24}$ is a hydrogen atom or a substituted or unsubstituted alkyl group));

δ is an atomic group necessary for completing a condensed benzene ring which may be substituted with one or more groups, and a substituent of the condensed benzene ring is a ballast group or contains a ballast group.

Representative examples of Y of the type illustrated by general formula (VI) are described in Japanese Patent Application (OPI) Nos. 104343/76, 46730/78, 130122/79 and 85055/82.

Another example of Y which is suitable for compounds of the type as described above is represented by the following general formula (VII):

(VII)

wherein Ball is the same as defined in the general formula (III); and

ε is an oxygen atom or =$NG^{32}$ (wherein $G^{32}$ is a hydroxyl group or an amino group which may be substituted). When ε is =$NG^{32}$, a typical example of $G^{32}$ is =C=N—$G^{32}$ which is formed by a dehydration reaction of a carbonyl reagent of $H_2N$—$G^{32}$ and a ketone. The compounds of formula $H_2N$—$G^{32}$ includes hydroxyamine, hydrazines, semicarbazides, and thiosemicarbazides. More specifically, the hydrazines include hydrazine, phenylhydrazine, substituted phenylhydrazine in which the phenyl group is substituted with, for example, an alkyl group, an alkoxyl group, a carboalkoxy group, and a halogen atom, and hydrazine isonicotinate. The semicarbazides include phenylsemicarbazide and substituted phenylsemicarbazides which are substituted with, for example, an alkyl group, an alkoxyl group, a carboalkoxyl group, and a halogen atom. The thiosemicarbazides include the analogous derivatives of the above semicarbazides.

In general formula (VII), β''' is a 5-, 6- or 7-membered saturated or unsaturated non-aromatic hydrocarbon ring. Typical examples are cyclopentanone, cyclohexanone, cyclohexenone, cyclopentenone, cycloheptanone, and cycloheptenone, which may be fused with a second ring in a suitable position of β''' to form a condensed ring. The second ring may be aromatic or non-aromatic, or a hydrocarbon ring or a hetero ring. When such a condensed ring is formed, condensed rings resulting from fusion of benzene and β''', such as indanone, benzcyclohexenone, and benzcycloheptenone, are preferred in the present invention.

The 5- to 7-membered non-aromatic hydrocarbon rings β''' or their condensed rings as described above may be substituted with one or more of an alkyl group, an aryl group, an alkyloxy group, an aryloxy group, an alkylcarbonyl group, an arylcarbonyl group, an alkylsulfonyl group, an arylsulfonyl group, a halogen atom, a nitro group, an amino group, an alkylamino group, an arylamino group, an amido group, an alkylamido group, an arylamido group, a cyano group, an alkylmercapto group, or an alkyloxycarbonyl group.

In general formula (VII), $G^{31}$ is a hydrogen atom or a halogen atom, such as fluorine, chlorine and bromine.

Representative examples of Y illustrated by general formula (VII) are described in Japanese Patent Application (OPI) Nos. 3819/78 and 48534/79.

Other examples of Y for the compound of the present invention are described in, for example, Japanese Patent Publication Nos. 32129/73, 39165/73, Japanese Patent Application (OPI) No. 64436/74, and U.S. Pat. No. 3,443,934.

Another example of Y is represented by the following general formula (VIII):

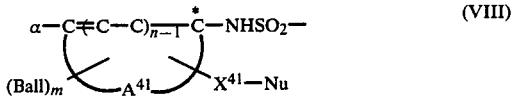

wherein α is $OR^{41}$ or $NHR^{42}$ (wherein $R^{41}$ is a hydrogen atom or a hydrolyzable group, and $R^{42}$ is hydrogen atom or an alkyl group having from 1 to 50 carbon atoms);

$A^{41}$ is an atomic group necessary for forming an aromatic ring;

Ball is an organic immobilizing group present in the aromatic ring;

m is an integer of 1 or 2, and when m is 2, Ball may be the same or different;

$X^{41}$ is a divalent organic group having from 1 to 8 atoms which forms a 5- to 12-membered ring in combination with an electrophilic center carbon atom marked with * by oxidation with a nucleophilic group (Nu);

Nu is a nucleophilic group;

n is an integer of 1 or 2; and

α is the same as defined in general formula (III).

Representative examples of Y illustrated by general formula (VIII) are described in Japanese Patent Application (OPI) No. 20735/82.

Another type of compound represented by the general formula (I) is a nondiffusible dye-providing compound which undergoes self-ring closing in the presence of a base, thereby releasing a diffusible dye, but does not substantially cause dye release by reacting with an oxidized product of a developing agent.

An example of Y which is effective for compound of the ring-closing is represented by the following general formula (IX):

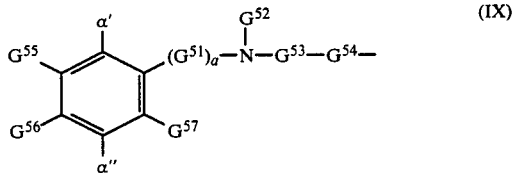

wherein α' is an oxidizable nucleophilic group, such as a hydroxyl group, a primary or secondary amino group, a hydroxyamino group, or a sulfonamido group, or its precursor, and is preferably a hydroxyl group;

α" is a dialkylamino group or any one of the groups defined for α', and preferably a hydroxyl group;

$G^{53}$ is an electrophilic group, such as —CO— or —CS—, and is preferably —CO—;

$G^{54}$ is an oxygen atom, a sulfur atom, a selenium atom, or a nitrogen atom. When it is a nitrogen atom, it may substituted with a hydrogen atom, an alkyl or substituted alkyl group having from 1 to 10 carbon atoms, or an aromatic compound radical having from 6 to 20 carbon atoms. A preferred example of $G^{54}$ is an oxygen atom.

In general formula (IX), $G^{51}$ is an alkylene group having from 1 to 3 carbon atoms;

a is 0 or 1 and preferably 0;

$G^{52}$ is a substituted or unsubstituted alkyl group having from 1 to 40 carbon atoms, or a substituted or unsubstituted aryl group having from 6 to 40 carbon atoms, and is preferably an alkyl group;

$G^{55}$, $G^{56}$ and $G^{57}$, which may be the same or different, are each a hydrogen atom, a halogen atom, a carbonyl group, a sulfamyl group, a sulfonamido group, an alkyloxy group having from 1 to 40 carbon atoms, or the same as defined for $G^{52}$, and $G^{55}$ and $G^{56}$ may combine together to form a 5- to 7-membered ring, $G^{56}$ may be

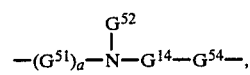

and at least one of $G^{52}$, $G^{55}$, $G^{56}$ and $G^{57}$ is a ballast group.

Representative examples of Y illustrated by general formula (IX) are described in Japanese Patent Application (OPI) No. 63618/76.

Other examples of Y which are suitable for ring-closing dye release compounds described above are represented by the following general formulae (XA) and (XB):

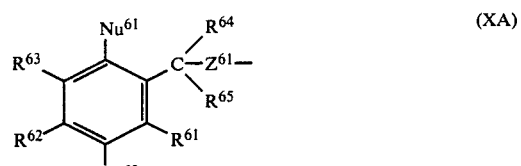

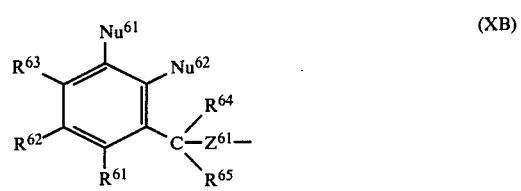

wherein $Nu^{61}$ and $Nu^{62}$ may be the same or different and each is a nucleophilic group or its percursor;

$Z^{61}$ is a divalent atomic group which is electrically negative to the carbon atom at which $R^{64}$ and $R^{65}$ are substituted;

$R^{61}$, $R^{62}$ and $R^{63}$, which may be the same or different, are each a hydrogen atom, a halogen atom, an alkyl group, an alkoxy group, or an acylamino group, provided that $R^{61}$ and $R^{62}$, when adjacent on the ring, may form a condensed ring, and $R^{62}$ and $R^{63}$, when adjacent on the ring, may form a condensed ring;

$R^{64}$ and $R^{65}$, which may be the same or different, are each a hydrogen atom, a hydrocarbon group, or a substituted hydrocarbon group; and a sufficiently large ballast group, Ball, to make the compound immobile is present in at least one of $R^{61}$, $R^{62}$, $R^{63}$, $R^{64}$ and $R^{65}$.

Representative example of Y illustrated by formulae (XA) and (XB) are described in Japanese Patent Application (OPI) Nos. 69033/78 and 130927/79.

Another example of Y which is suitable for ring-closing dye-releasing compounds described above is represented by the general formula (XI):

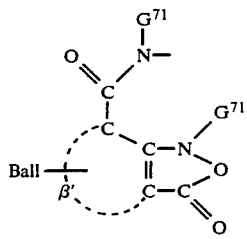

(XI)

wherein Ball and β' are the same as defined in general formula (IV); and

G⁷¹ is an alkyl group (including a substituted alkyl group).

Representative examples of Y illustrated by general formula (XI) are described in Japanese Patent Application (OPI) Nos. 111628/74 and 4819/77.

Another type of compound represented by the general formula (I) or (II) is a nondiffusible dye-providing compound which does not release a dye by itself, but releases a dye on reacting with a reducing agent. In this case, it is preferred to use in combination an "electron donor" compound facilitating the redox reaction.

An example of Y which is effective for compounds of this type is represented by the general formula (XII):

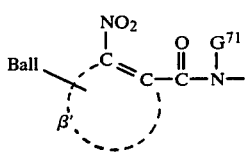

(XII)

wherein Ball and β' are the same as defined in general formula (IV); and

G⁷¹ is an alkyl group (including a substituted alkyl group).

Representative examples of Y illustrated by general formula (XII) are described in Japanese Patent Application (OPI) Nos. 35533/78 and 110827/78.

Another example of Y which is suitable for compounds is represented by the general formula (XIII):

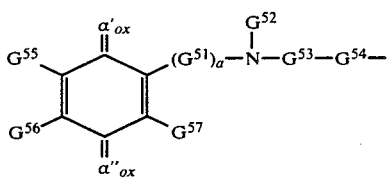

(XIII)

wherein α'$_{ox}$ and α"$_{ox}$ are groups releasing α' and α", respectively, upon reduction; and α', α", G⁵¹, G⁵², G⁵³, G⁵⁴, G⁵⁵, G⁵⁶, G⁵⁷ and a are the same as defined in general formula (IX).

Representative examples of Y illustrated by general formula (XIII) are described in Japanese Patent Application (OPI) No. 110827/78, U.S. Pat. Nos. 4,356,249 and 4,358,525.

Other examples of Y which are suitable for compounds are groups represented by the general formulae (XIVA) and (XIVB):

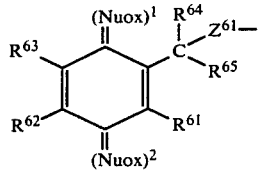

(XIVA)

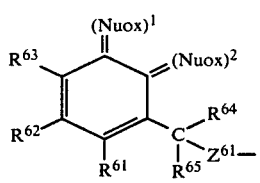

(XIVB)

wherein (Nuox)¹ and (Nuox)² may be the same or different and are oxidized nucleophilic groups; and R⁶¹, R⁶², R⁶³, R⁶⁴, R⁶⁵ L and Z⁶¹ are the same as defined in general formulae (XA) and (XB).

Representative examples of Y illustrated by general formula (XIVA) and (XIVB) are described in Japanese Patent Application (OPI) Nos. 130927/79 and 164342/81.

In the reference cited in connection with general formulae (XII), (XIII), (XIVA) and (XIVB) are described electron donors to be used in combination with Y.

Another type of compound represented by general formula (I) or (II) is a linked donor acceptor compound (an LDA compound). This compound is a nondiffusible dye-providing compound which releases a diffusible dye by a donor acceptor reaction in the presence of a base, but does not substantially release a dye by reacting with an oxidized product of a developing agent.

An example of Y which is effective for LDA compounds is represented by the general formula (XV):

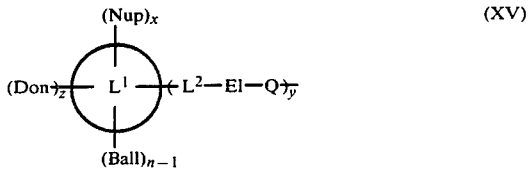

(XV)

wherein n, x, y and z are each 1 or 2;

Don is an electron donor or a group containing an electron donor precursor;

L¹ is an organic group connecting Nup to —El—Q or Don;

Nup is a precursor of a nucleophilic group;

El is an electrophilic center;

Q is a divalent group;

Ball is a ballast group; and

L² is a connecting group.

Representative example of Y illustrated by general formula (XV) are described in Japanese Patent Application No. 60289/83 (corresponding to U.S. patent application Ser. No. 597,623 filed on Apr. 6, 1984).

The ballast group is an organic ballast group capable of making dye-providing compounds nondiffusible and is preferably a group containing a hydrophobic group having from 8 to 32 carbon atoms. These organic ballast groups are linked to the dye-providing compounds, directly or through a connecting group, such as an imino bond, an ether bond, a thioether bond, a carbon-amido bond, a sulfonamido bond, a ureido bond, an ester bond, an imido bond, a carbamoyl bond, and a sulfamoyl group. These connecting groups may be used singly or in combination with each other.

Representative examples of the ballast group include an alkyl group and an alkenly group (e.g., a dodecyl group and an octadecyl group); an alkoxyalkyl group (e.g., a 3-(octyloxy)propyl group and a 3-(2-ethylundecyloxy)propyl group as described in Japanese Patent Publication No. 27563/64); an alkylaryl group (e.g., a 4-nonylphenyl group and a 2,4-di-tert-butylphenyl group); an alkylallyloxyalkyl group (e.g., a 2,4-di-tert-pentylphenoxymethyl group, an α-(2,4-di-tert-pentylphenoxy)propyl group, and a 1-(3-pentadecylphenoxy)ethyl group); an acylamidoalkyl group (e.g., those described in U.S. Pat. Nos. 3,337,344 and 3,418,129, and a 2-(N-butylhexadecaneamido)ethyl group); an alkoxyaryl group and an aryloxyaryl group (e.g., a 4-(n-octadecyloxy)phenyl group and a 4-(4-n-dodecylphenyloxy)phenyl group); a radical having a long chain aliphatic group, such as alkyl and alkenyl, and a water-soluble group, such as a carboxyl group and a sulfo group (e.g., a 1-carboxymethyl-2-nonanedecenyl group and a 1-sulfoheptadecyl group); an alkyl group substituted with an ester group (e.g., a 1-ethoxycarbonylheptadecyl group and a 2-(n-dodecyloxycarbonyl)ethyl group); an alkyl group substituted with an aryl group or a heterocyclic group (e.g., a 2-[4-(3-methoxycarbonyluneicosanamido)phenyl]ethyl group and a 2-[4-(2-n-octadecylsuccinimido)phenyl]ethyl group); and an aryl group substituted with an aryloxyalkoxycarbonyl group (e.g., a 4-[2-(2,4-di-tert-pentylphenyloxy)-2-methylopropyloxycarbonyl]phenyl group).

Particularly preferred among the above-described organic ballast groups are those bound to a connecting group represented by the following general formulae (XVI), (XVII), (XVIII) and (XIX):

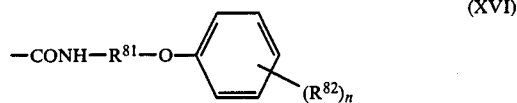  (XVI)

  (XVII)
  (XVIII)
  (XIX)

wherein $R^{81}$ is an alkylene group having from 1 to 10 carbon atoms, preferably from 1 to 6 carbon atoms (e.g., a propylene group or a butylene group);

$R^{82}$ is a hydrogen atom or an alkyl group having from 1 to 10 carbon atoms, preferably from 1 to 6 carbon atoms (e.g., a tert-amyl group);

n is an integer of from 1 to 5 and preferably 1 or 2;

$R^{83}$ is an alkyl group having from 4 to 30 carbon atoms, preferably from 10 to 20 carbon atoms (e.g., a dodecyl group, a tetradecyl group or a hexadecyl group); and $R^{84}$ is an alkyl group having from 8 to 30 carbon atoms, preferably from 10 to 20 carbon atoms (e.g., a hexadecyl group or an octadecyl group), or a substituted alkyl group having a total number of carbon atoms of at least 8 (in which the alkyl radical has at least one carbon atom, and the substituent includes a carbamoyl group).

Representative examples of Y which are preferably used in the present invention are shown below, in which the Roman numeral designations of the structural formulae correspond to those of the above-described general formulae, although the present invention should not be construed as being limited thereto.

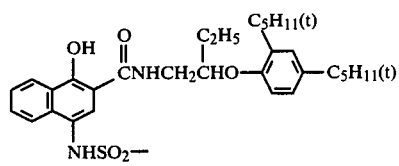 III-1

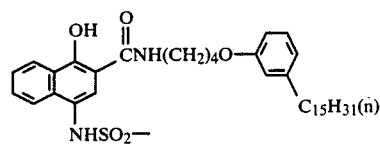 III-2

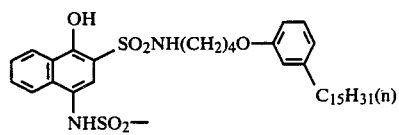 III-3

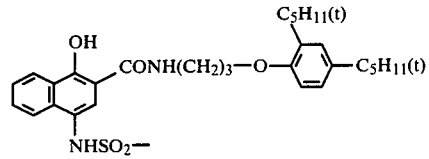 III-4

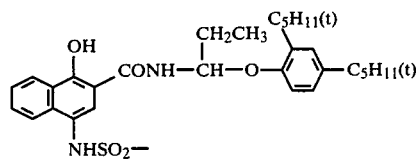 III-5

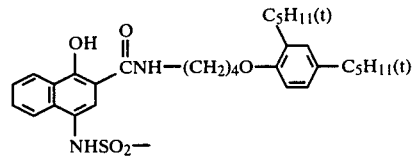 III-6

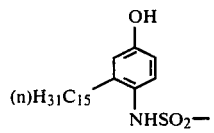 III-7

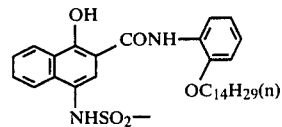 III-8

-continued
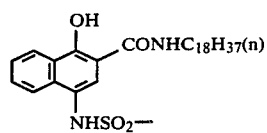 III-9
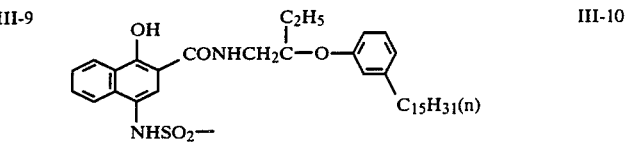 III-10
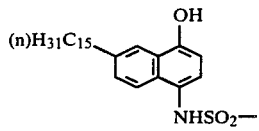 III-11
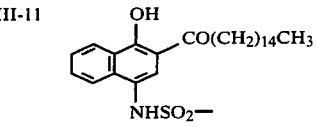 III-12
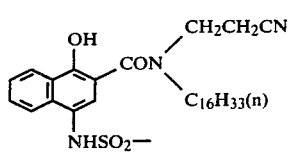 III-13
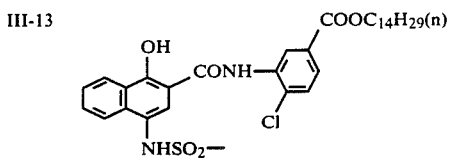 III-14
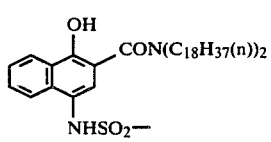 III-15
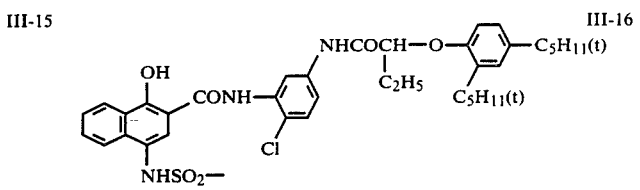 III-16
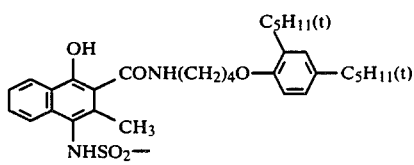 III-17
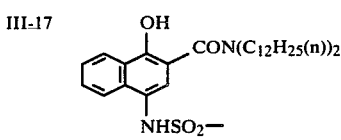 III-18
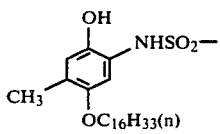 III-19
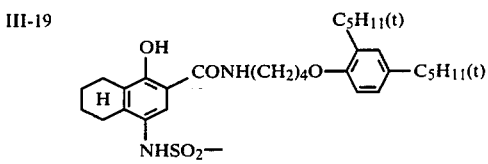 III-20
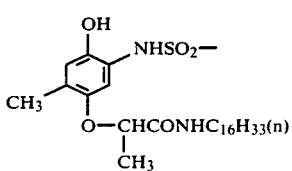 IV-1
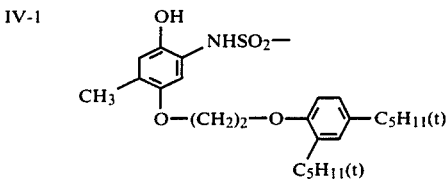 IV-2
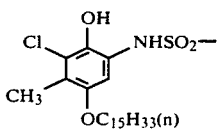 IV-3
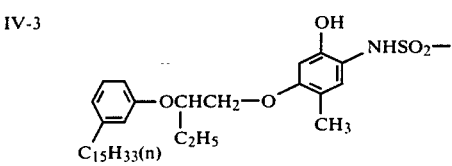 IV-4
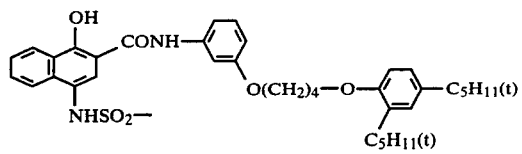 IV-5
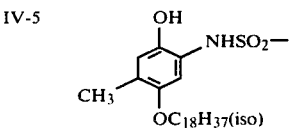 IV-6

-continued
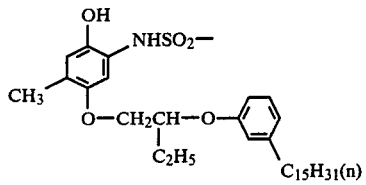 IV-7
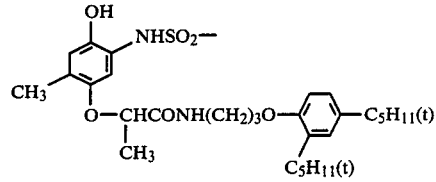 IV-8
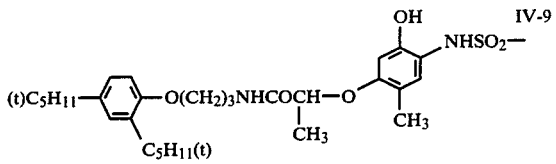 IV-9
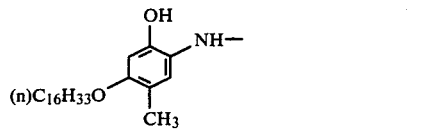 IV-10
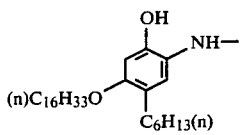 IV-11
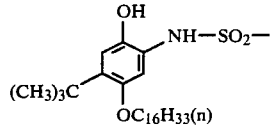 IV-12
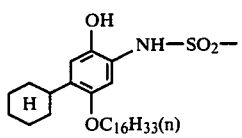 IV-13
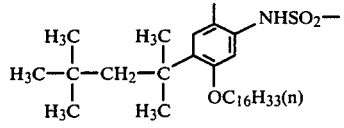 IV-14
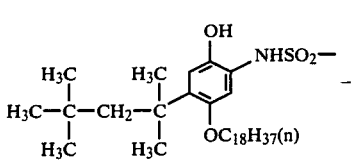 IV-15
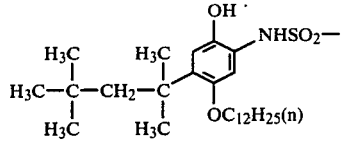 IV-16
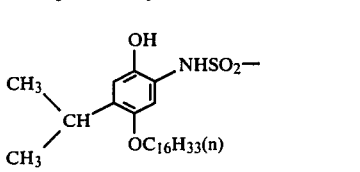 IV-17
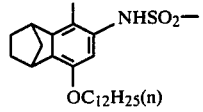 IV-18
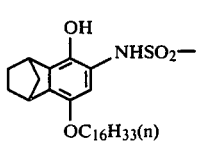 IV-19
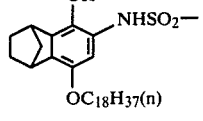 IV-20
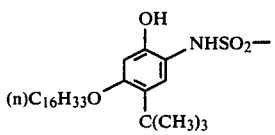 IV-21
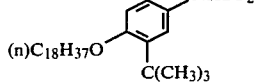 IV-22
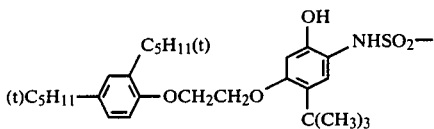 IV-23
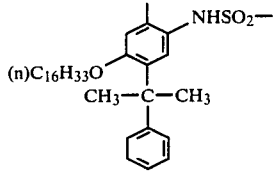 IV-24
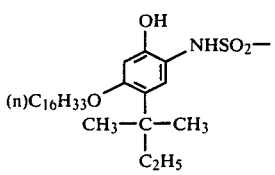 IV-25
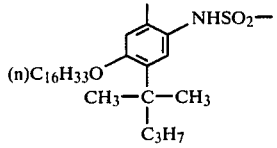 VI-26

-continued
VI-27 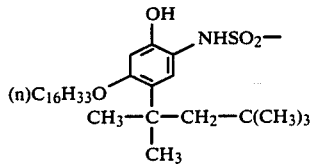
IV-28 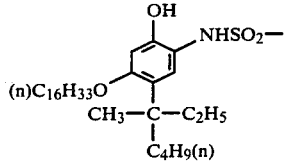
IV-29 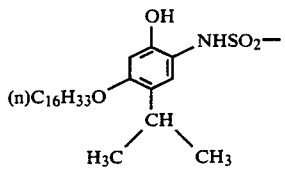
IV-30 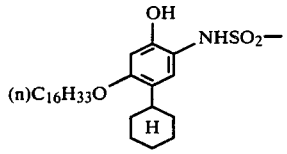
IV-31 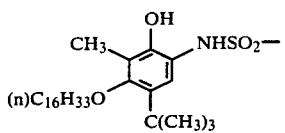
VI-32 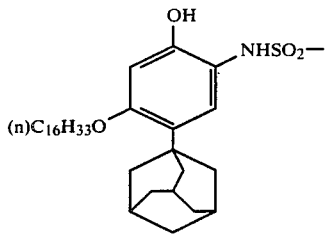
VI-33 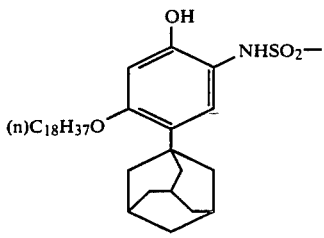
IV-34 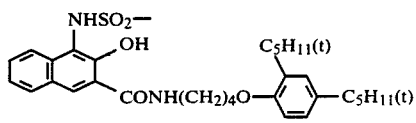
IV-35 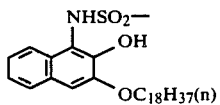
IV-36 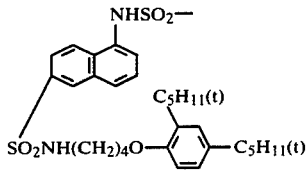
V-1 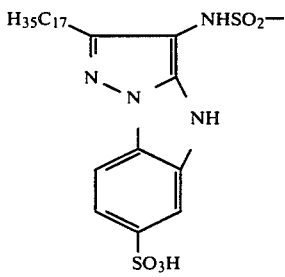
V-2 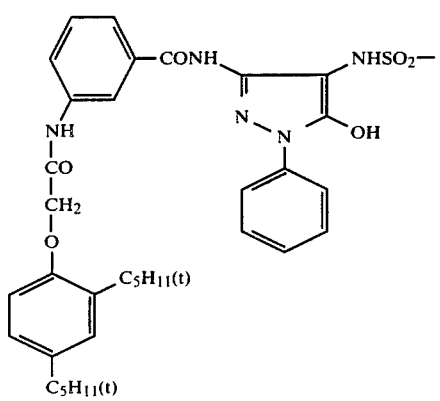

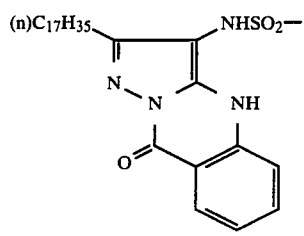 V-3
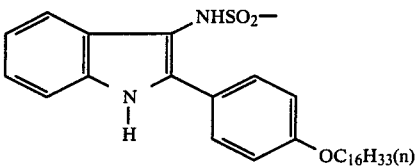 VI-1
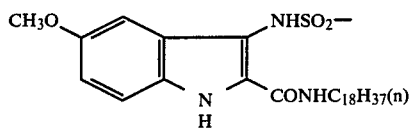 VI-2
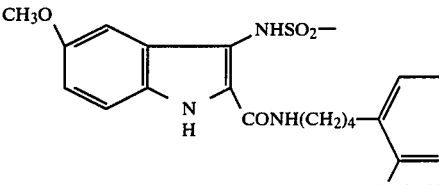 VI-3
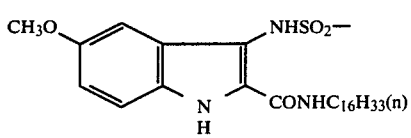 VI-4
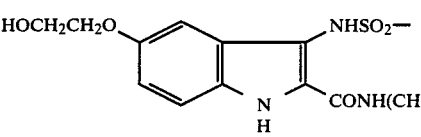 VI-5
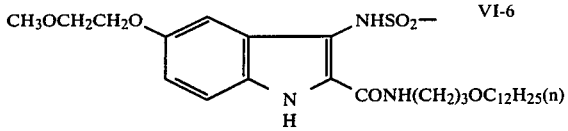 VI-6
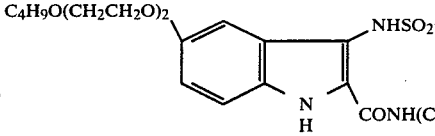 VI-7
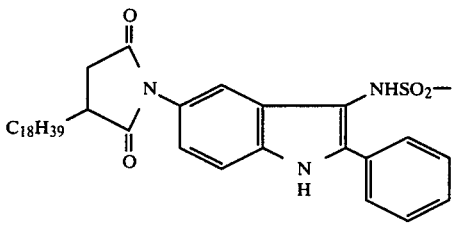 VI-8
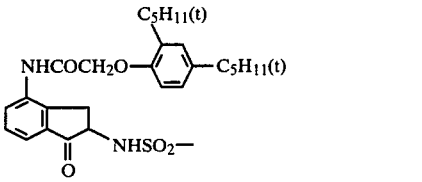 VII-1
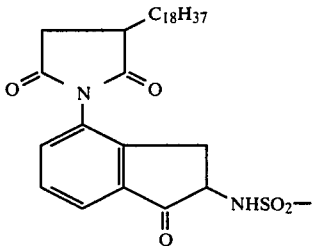 VII-2
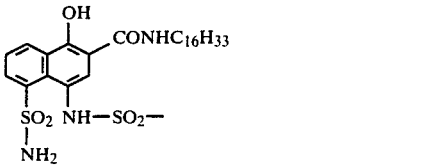 VIII-1
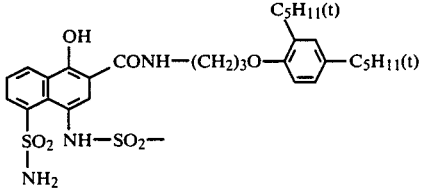 VIII-2
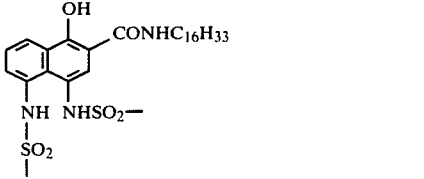 VIII-3
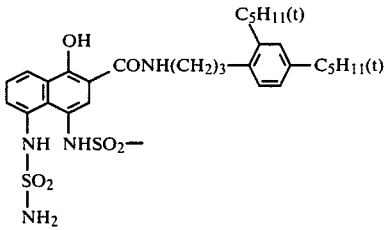 VIII-4
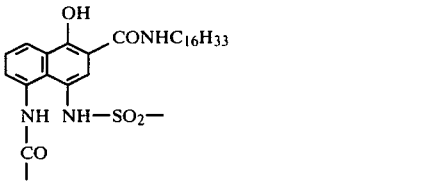 VIII-5

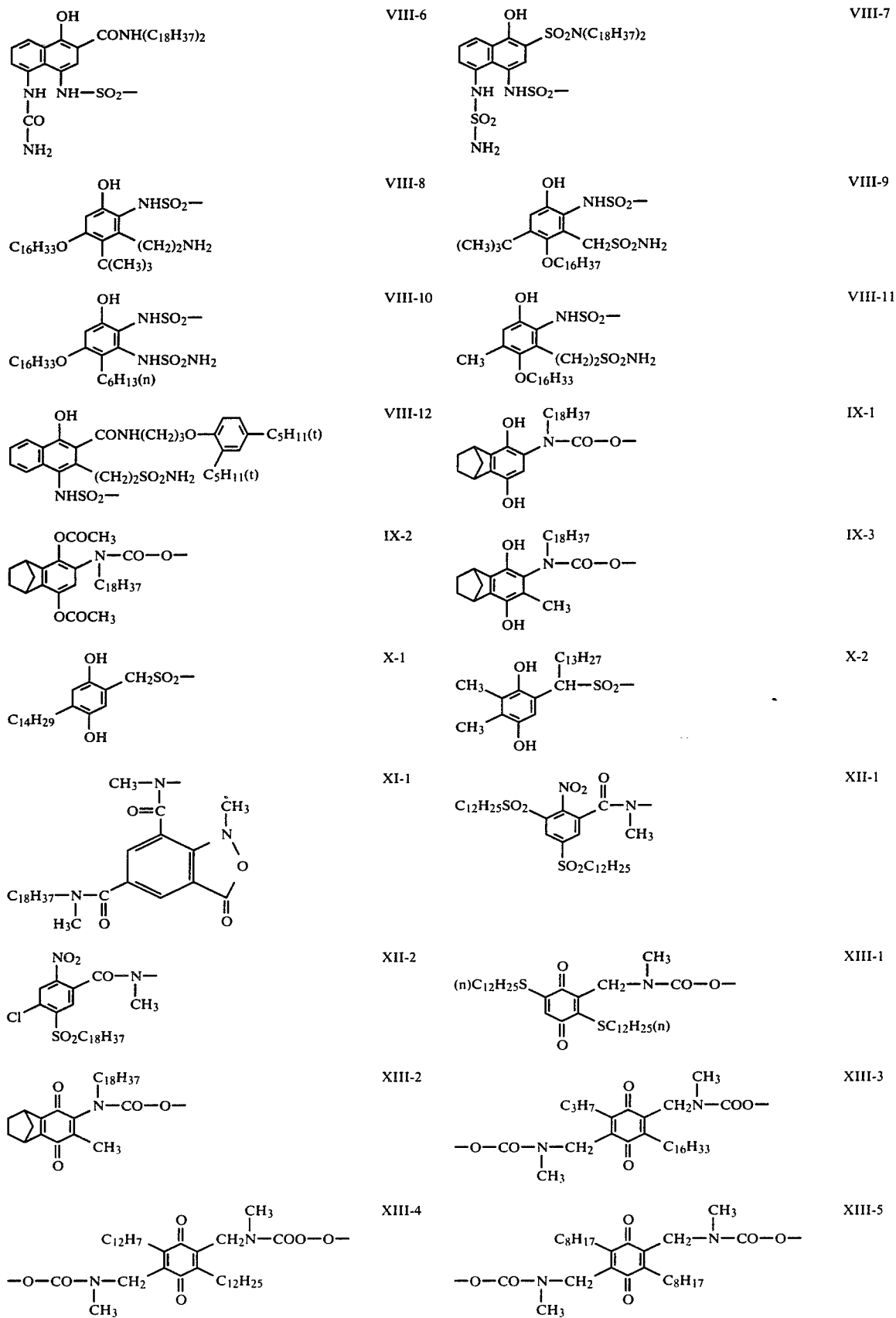

-continued
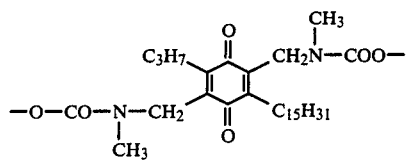 XIII-6
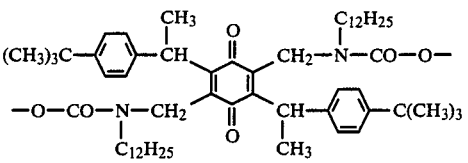 XIII-7
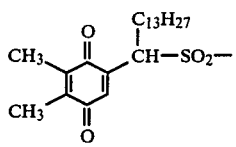 XIV-1
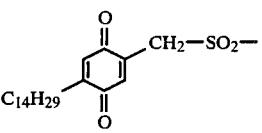 XIV-2
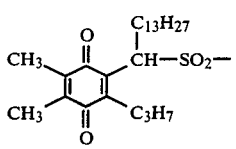 XIV-3
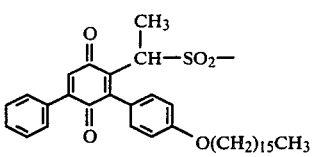 XIV-4
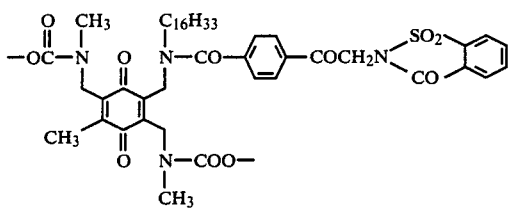 XV-1
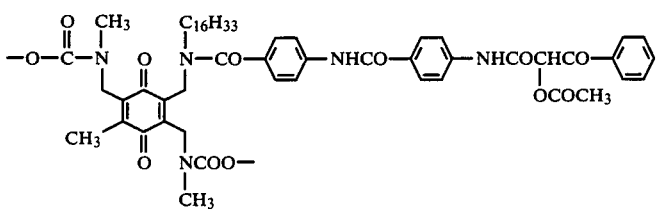 XV-2
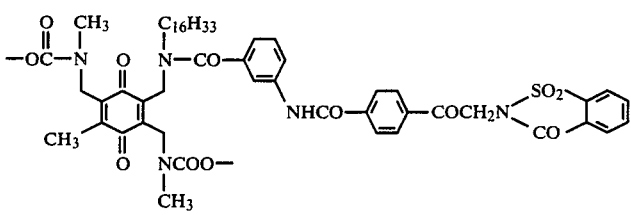 XV-3
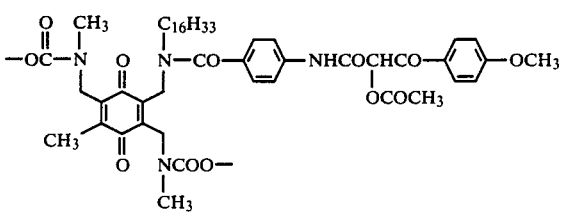 XV-4
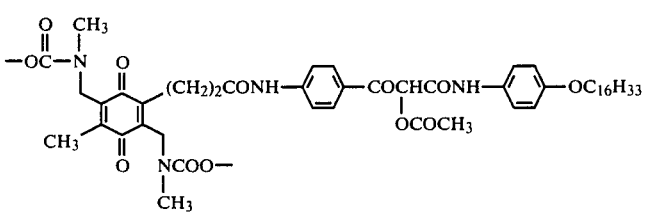 XV-5

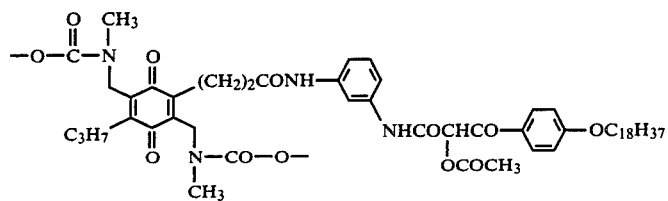
XV-6
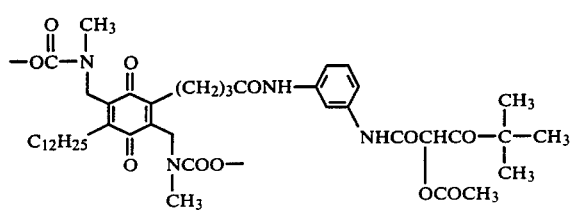
XV-7
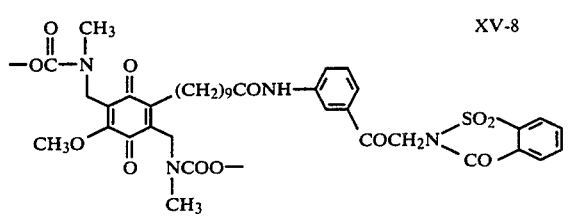
XV-8
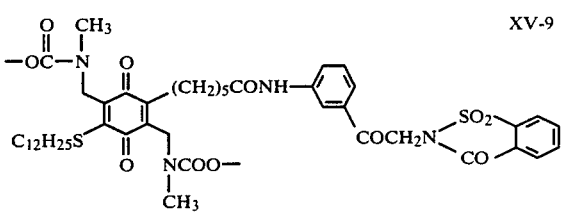
XV-9
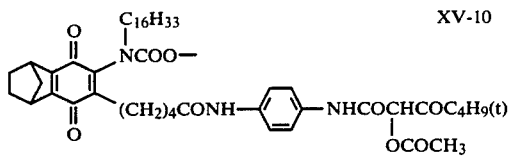
XV-10
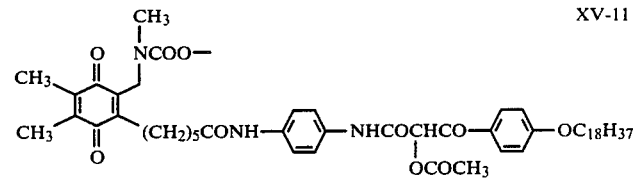
XV-11
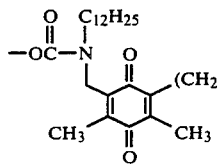
XV-12
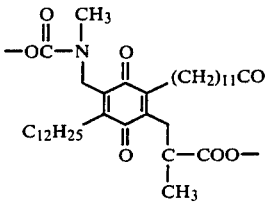
XV-13
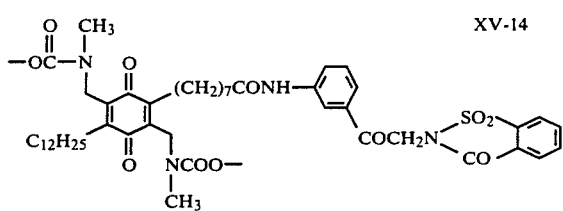
XV-14
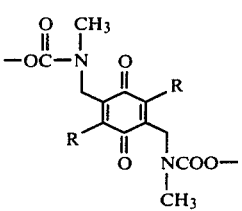
XV-15
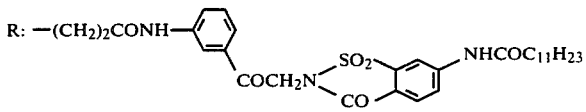
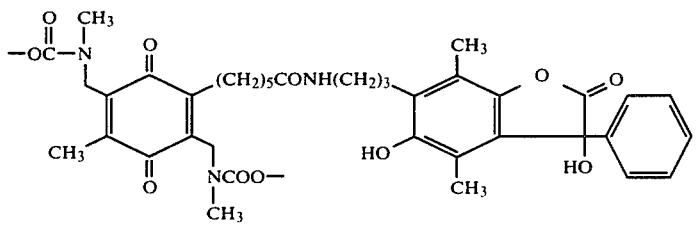
XV-16

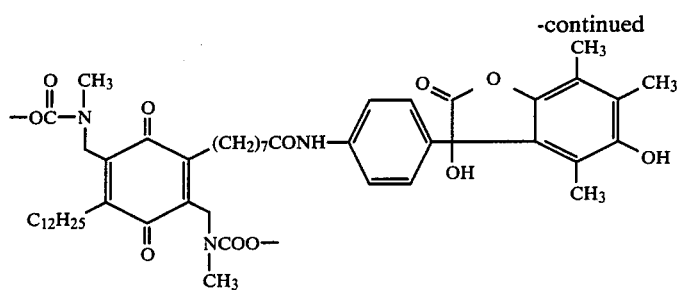
XV-17
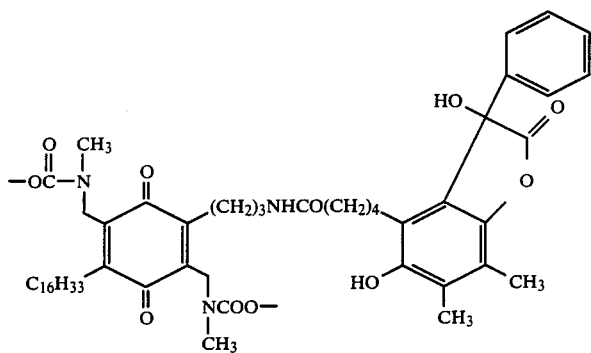
XV-18
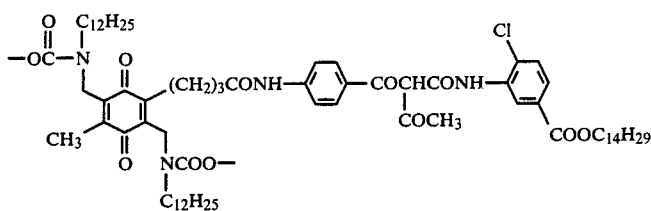
XV-19
Representative examples of dye-providing compound (I) which are preferably used in the present invention are shown below, although the present invention should not be construed as being limited thereto.
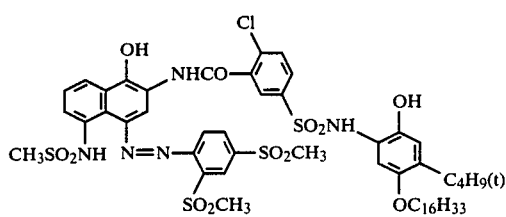
(1)
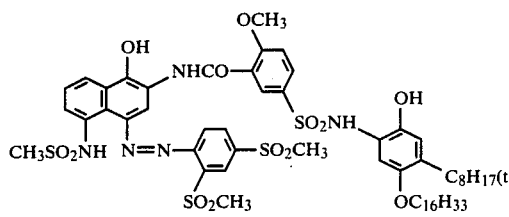
(2)
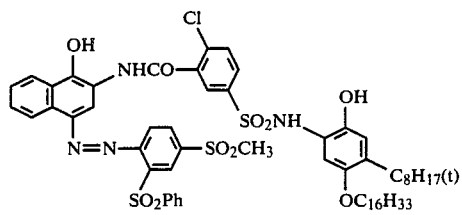
(3)
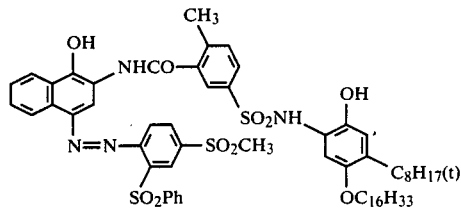
(4)
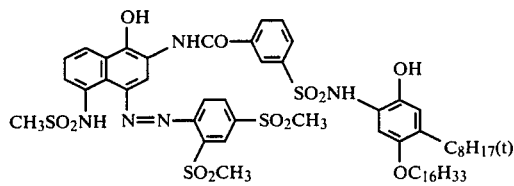
(5)
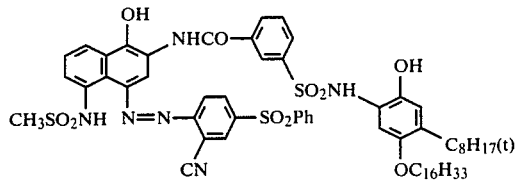
(6)

-continued
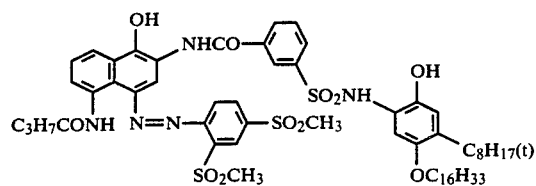 (7)
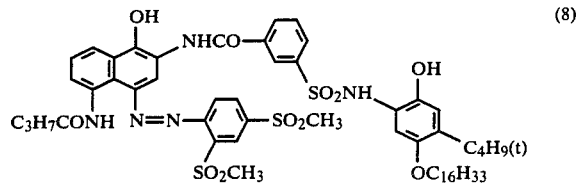 (8)
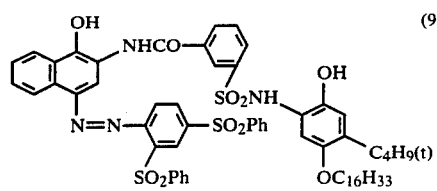 (9)
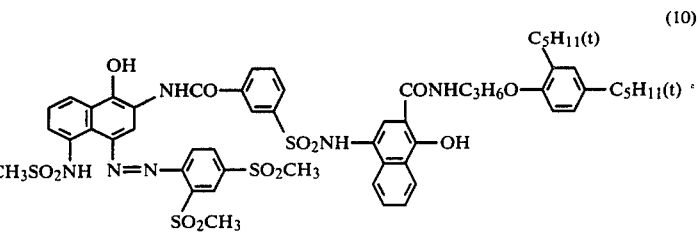 (10)
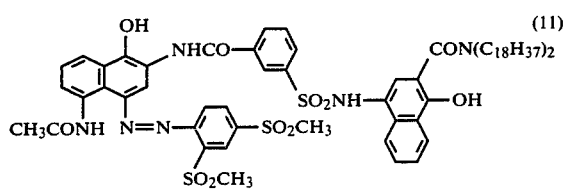 (11)
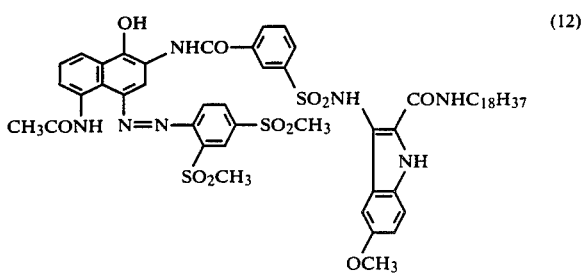 (12)
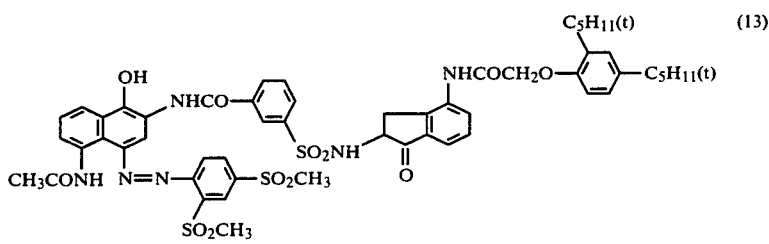 (13)
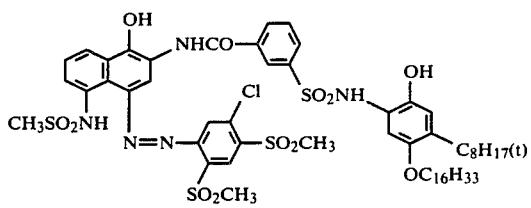 (14)
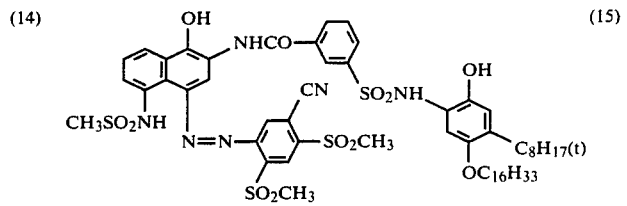 (15)
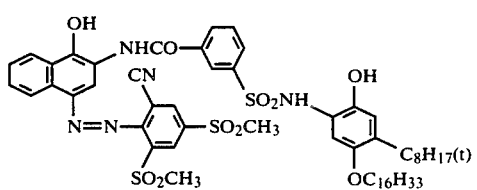 (16)
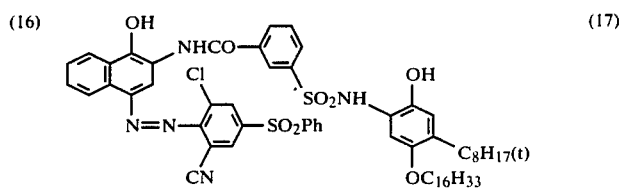 (17)
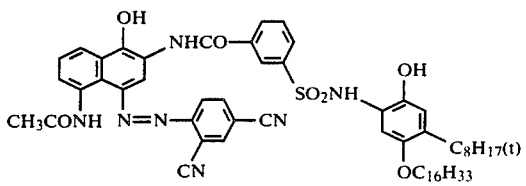 (18)
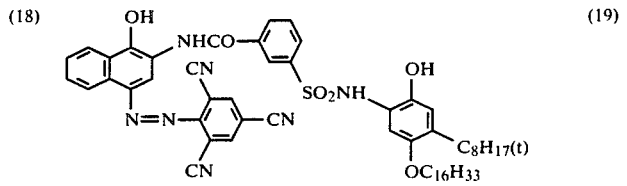 (19)

-continued
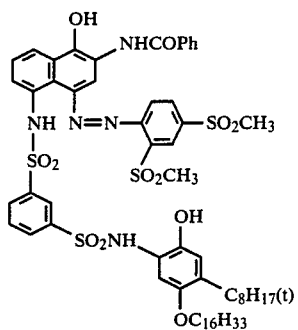
(20)
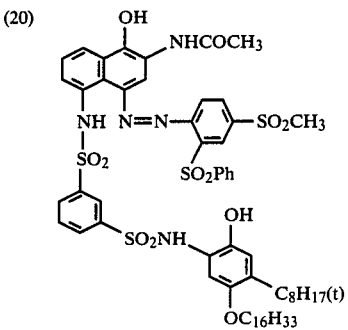
(21)
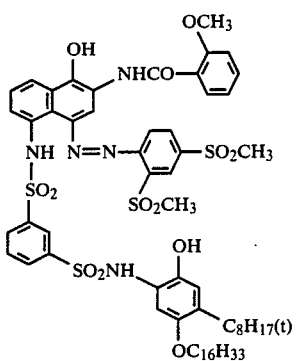
(22)
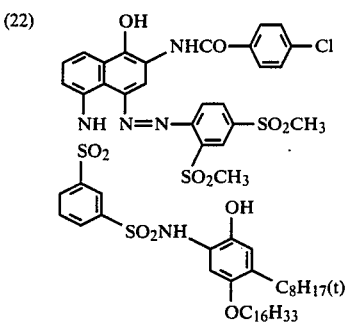
(23)
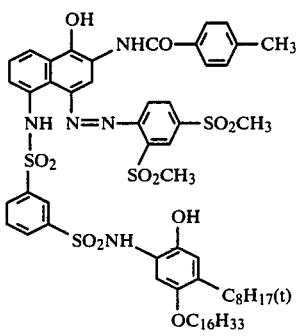
(24)
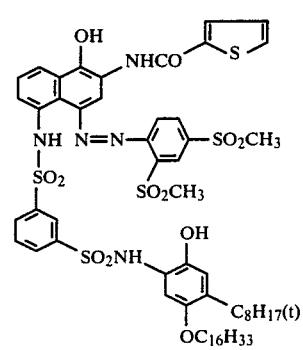
(25)
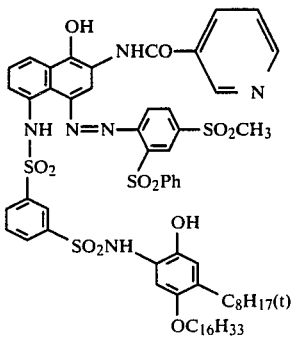
(26)
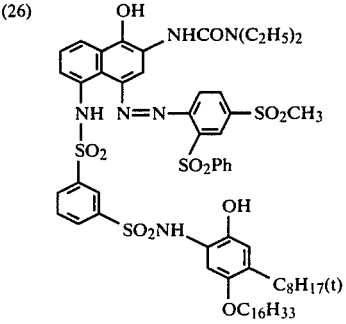
(27)

-continued
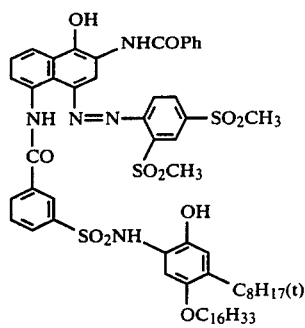 (28)
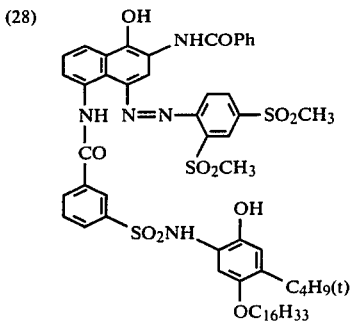 (29)
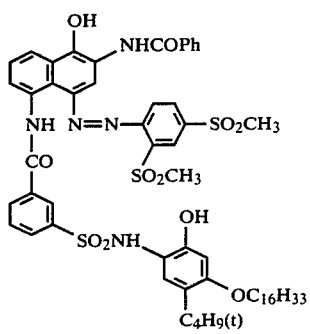 (30)
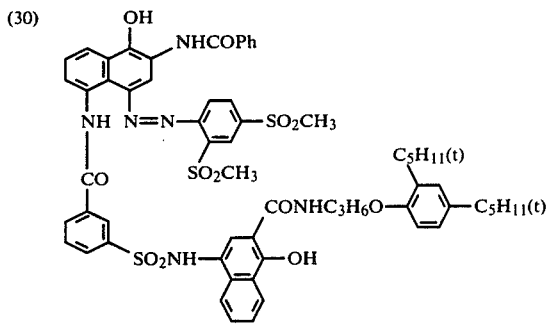 (31)
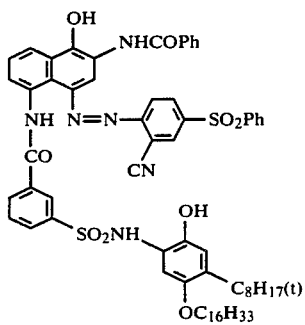 (32)
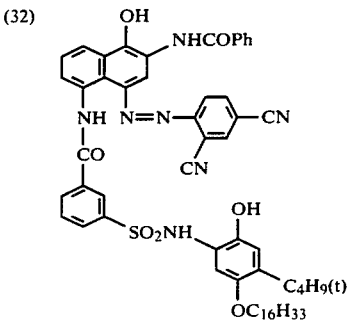 (33)
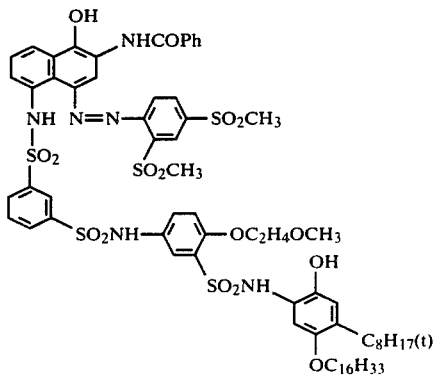 (34)
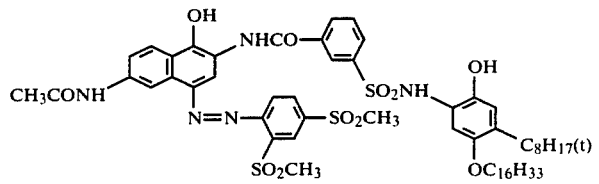 (35)

-continued
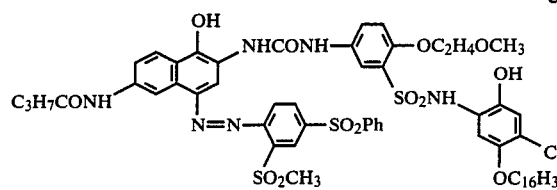 (36)
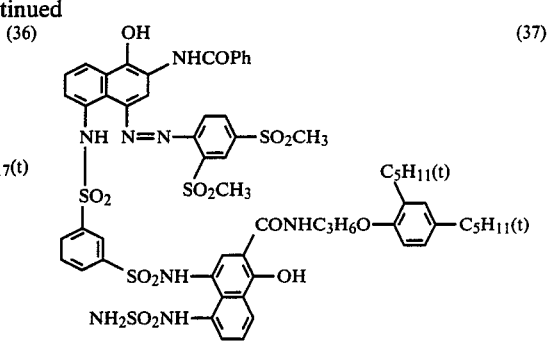 (37)
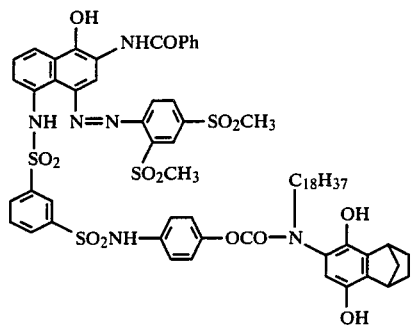 (38)
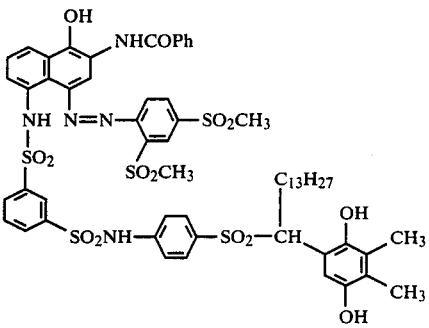 (39)
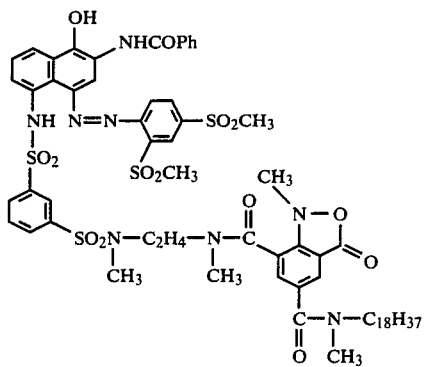 (40)
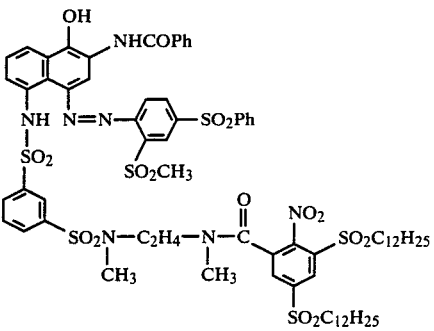 (41)
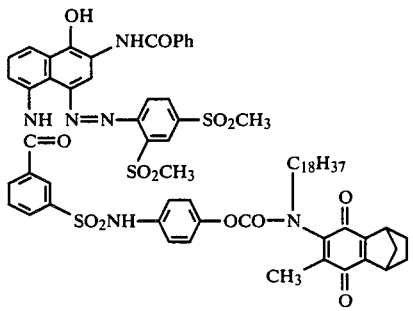 (42)
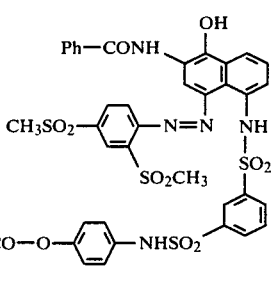 (43)

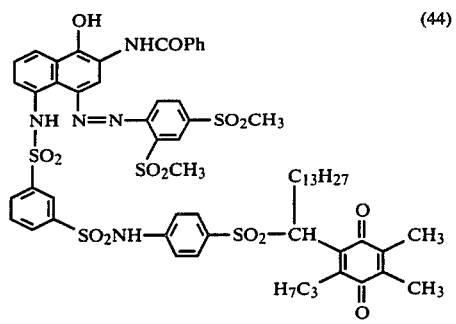 (44)

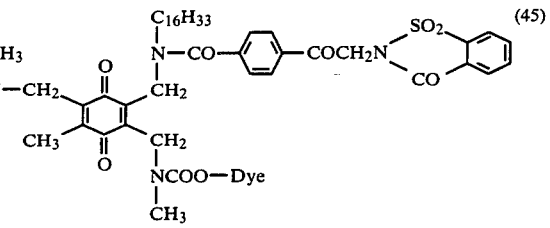 (45)

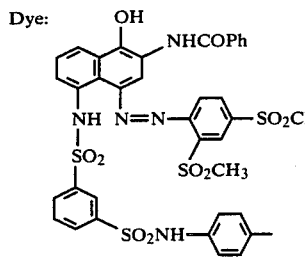

A method of preparation of the dye-providing compound of the present invention is as follows.

The structural feature of the dye-providing compound of the present invention is an acylamino group in the 2-position of the coupling component (1-naphthol). The easiest procedure for introduction of the acylamino group involves nitrosonating 1-naphthols, and reducing and acylating the nitroso compounds in the usual manner. In the nitrosonating process, to introduce the acylamino group selectively in the 2-position, it is convenient to perform the reaction in the presence of various metallic ions and to isolate the nitroso compound as a metal chelate. Of useful metallic ions, a zinc ion is particularly preferred.

Another method of introduction is to open the ring of an oxazole ring which is prepared by the sequence of steps of acylation, oximation, and Beckmann rearrangement. Another method is by azo coupling in the presence of copper ions.

A typical route of synthesis of compounds of general formulae (IA) and (IB) is shown below.

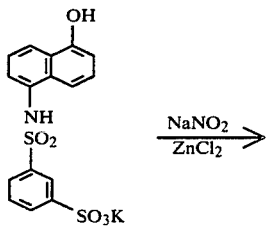

-continued

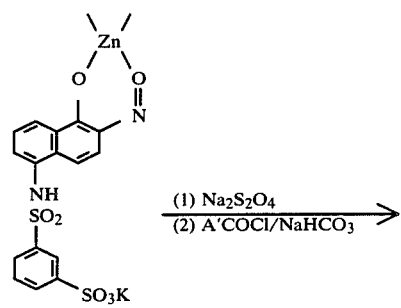

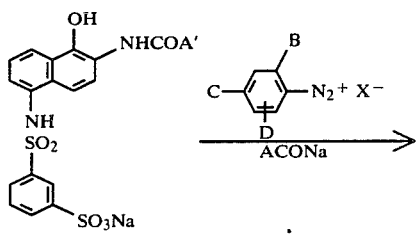

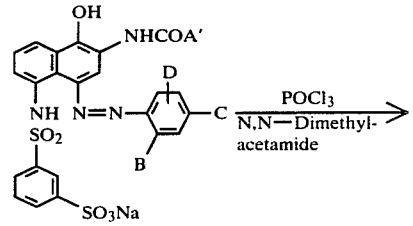

-continued

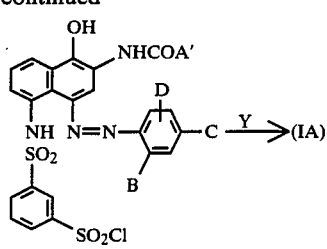

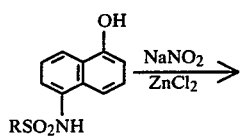

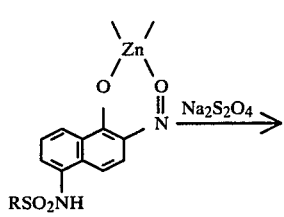

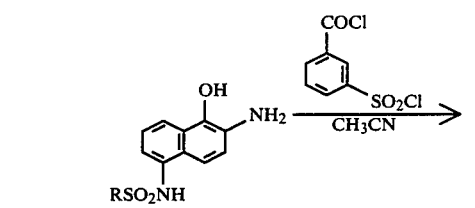

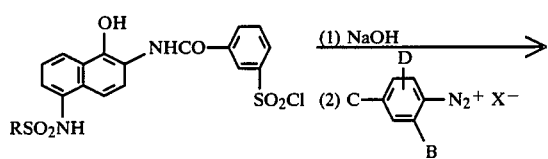

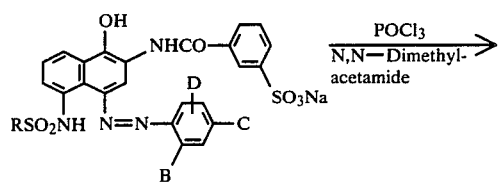

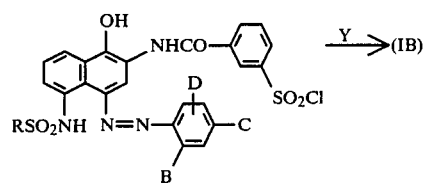

or

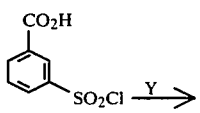

-continued

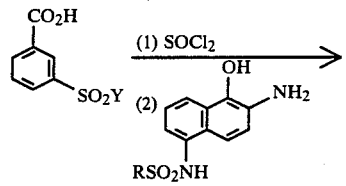

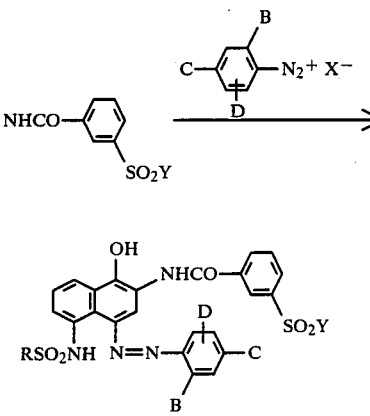

Several preparation examples are shown below.

PREPARATION EXAMPLE 1

Preparation of Dye-Providing Compound (5)

(a)
2-(3-Carboxyphenylsulfonylamino)-4-hexadecyloxy-5-tert-octylphenol (5-a)

63.4 g of 2-amino-4-hexadecyloxy-5-tert-octyphenol p-toluenesulfonate was dissolved in a mixture of 200 ml of dimethylacetamide and 50 ml of pyridine, and 26.5 g of 3-carboxybenzenesulfonyl chloride was gradually added while cooling with ice. The mixture was stirred at room temperature for 1 hour. The reaction mixture was then poured into cooled diluted hydrochloric acid and extracted with ethyl acetate. The extract was washed with water and dried, and then the solvent was distilled away under reduced pressure, thereby yielding a light brown oil (5-a). (b) 2-Amino-5-methanesulfonylamino-1-naphthol (5-b)

A mixture of 119 g of 5-methanesulfonylamino-1-naphthol, 100 g of zinc chloride, and 500 ml of ethanol was heated to 50° C. and then a solution of 35 g of sodium nitrite dissolved in 70 ml of water was added dropwise at 50°-65° C. The mixture was stirred for 2 hours while heating at 60°-65° C. The reaction mixture was cooled with water to room temperature, and red brown crystals were filtered off and washed with ethanol. These crystals were added to 200 ml of concentrated hydrochloric acid and stirred at room temperature for 1 hour. Then, 200 ml of water was added, thereby precipitating yellow brown crystals (2-nitroso-5-methanesulfonylamino-1-naphthol). These crystals were filtered off, washed with water, and dried. The yield was 90 g.

30 g of the nitroso compound as prepared above was dissolved in 300 ml of a 10% aqueous solution of sodium hydroxide, and 70 g of sodium hydrosulfite was gradually added thereto. When the solution turned in color from deep red to light orange, it was cooled with ice and neutralized with diluted hydrochloric acid.

A light pink precipitate was filtered off, washed with water, and dried under reduced pressure, thereby yielding 20 g of 2-amino-5-methanesulfonylamino-1-naphthol (5-b).

(c) Compound (5-c)

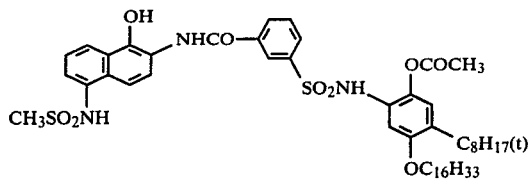

To a mixture of 64 g of Compound (5-a), 50 ml of acetonitrile, and 20 ml of pyridine was added dropwise 20 ml of acetic anhydride at room temperature. The resulting mixture was allowed to stand overnight, and then the acetonitrile was removed by distilling under reduced pressure. The residue was poured into cooled diluted hydrochloric acid. A light brown oil separated was extracted with ethyl acetate, washed with water, dried, and then the ethyl acetate was distilled off under reduced pressure. To the residue were added 100 ml of methanol and 10 ml of water to crystalline it, and the thus obtained crystals were filtered off (yield, 48 g). A mixture of 34.4 g of the crystals and 12.6 g of Compound (5-b) was dissolved in 80 ml of dried tetrahydrofuran, and 15.5 g of dicyclohexylcarbodiimide was gradually added thereto. The resulting mixture was stirred at room temperature for 2 hours. Crystals precipitated were filtered off and the solvent was distilled away from the filtrate. The residue was purified by silica gel chromatography (an eluting solution: ethyl acetate/hexane=1/1), thereby yielding 24 g of Compound (5-c).

(d) Compound (5-d)

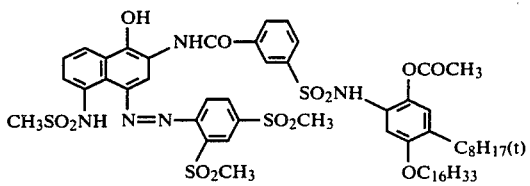

3 g of 2,4-dimethanesulfonylaniline was diazonated with nitrosylsulfuric acid in the usual manner. 9.2 g of Compound (5-c) was dissolved in a mixture of 90 ml of methyl cellosolve and 10 ml of acetic acid, and 27 g of sodium acetate was added thereto. Then, the above-prepared diazo solution was added at 2°–5° C. The resulting mixture was stirred at 10° C. for 1 hour, and 100 ml of acetonitrile and 50 ml of water were added. Orange precipitates formed were filtered off. These crystals were fully washed with hot acetonitrile and hot water and then dried, thereby yielding 9.6 g of Compound (5-d).

(e) Dye-Providing Compound (5)

9 g of Compound (5-d) was dissolved in 50 ml of dimethylacetamide and then a solution of 2.5 g of potassium hydroxide dissolved in 30 ml of methanol was added thereto in a nitrogen atmosphere. The mixture was stirred at room temperature for 30 minutes and then diluted hydrochloric acid was added. Orange precipitates formed were filtered off an washed with acetonitrile and water. A crude product was recrystallized from acetonitrile, thereby yielding 3.8 g of the dye-providing compound (5), m.p. 230°–232° C.

PREPARATION EXAMPLE 2

Preparation of Dye-Providing Compound (2)

The dye-providing compound (2) was prepared in the same manner as in Preparation Example 1 except that in the preparation of Compound (5-a) 3-carboxy-4-methoxybenzenesulfonyl chloride was used in place of 3-carboxybenzenesulfonyl chloride. The melting point of the product obtained was 234°–236° C.

PREPARATION EXAMPLE 3

Preparation of Dye-Providing Compound (20)

(a)
2-Benzoylamino-5-(3-sulfophenylsulfonylamino)-1-naphthol sodium salt (20-a)

A mixture of 209 g of a 5-(3-sulfophenylsulfonylamino)-1-naphthol potassium salt, 136 g of zinc chloride, 500 ml of ethanol and 100 ml of water was heated to 50° C., and a solution of 39 g of sodium nitrite dissolved in 100 ml of water was added dropwise at 50°–60° C. The resulting mixture was stirred for 3 hours while heating at 60° C. and then allowed to cool to room temperature. Red brown crystals (zinc chelate of the 2-nitroso compound) were filtered off and washed with ethanol.

A mixture of 96 g of the crystals as prepared above, 80 g of sodium hydrosulfite, 50 ml of methanol, and 400 ml of water was heated to 60° C. in a nitrogen atmosphere and stirred at 60° C. for 30 minutes. It was then cooled to 20° C., and 25.2 g of sodium hydrogen-carbonate was added. Thereafter, 35 ml of benzoyl chloride was added dropwise at 15°–20° C.

The mixture was stirred at 20° C. for 30 minutes, gradually heated to 60° C., and heated at 60° C. for 30 minutes. 50 ml of a saturated aqueous sodium hydrogencarbonate solution and 200 ml of a saturated brine were added. The resulting mixture was cooled to 10° C., and stirred at 10° C. for 1 hour. Gray white crystals of Compound (20-a) were filtered off, washed with brine, and dried. The yield was 108 g.

(b) Compound (20-b)

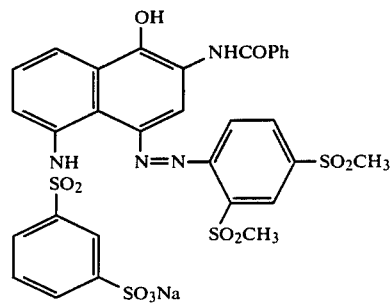

27 g of Compound (20-a) was added to a mixture of 4 g of sodium hydroxide, 103 g of sodium acetate, 100 ml of dimethylformamide, and 200 ml of water and the resulting mixture was stirred at 50° C. for 30 minutes.

The mixture was cooled to 5° C., and then a solution of 2,4-dimethanesulfonylaniline diazodium salt was added in an amount corresponding to 0.07 mol at 5°–8°

C. The resulting mixture was stirred at 10° C. for 1 hour, and crystals precipitated were filtered off, washed with brine, and dried, thereby yielding 28 g of green brown crystals of Compound (20-b).

(c) Compound (20-c)

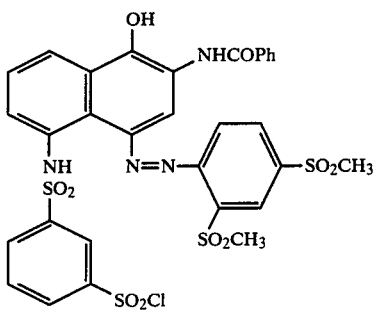

25 g of Compound (20-b) was finely ground and added to a mixture of 75 ml of dimethylacetamide and 100 ml of acetonitrile. To the resulting mixture was added dropwise 50 ml of phosphorus oxychloride at 28°–32° C. The mixture was stirred at 30°–35° C. for 5 hours. The reaction mixture was then poured into ice water, and orange red precipitates formed were filtered off, washed with water and air dried, thereby yielding 14 g of Compound (20-c).

(d) Dye-Providing Compound (20)

5.3 g of 2-amino-4-hexadecyloxy-5-tert-octylphenol p-toluenesulfonate was dissolved in a mixture of 30 ml of dimethylacetamide and 5 ml of pyridine, and then 6.5 g of Compound (20-c) was gradually added while cooling with ice.

The mixture was stirred at room temperature for 1 hour. The reaction mixture was then poured into cooled diluted hydrochloric acid, and orange brown precipitates formed were filtered off, washed with water, and dried. This crude product was extracted with hot ethyl acetate, and the solvent was distilled away from the extract. The residue was recrystallized from acetonitrile, thereby yielding 3.5 g of orange brown crystals of the dye-providing compound (20), m.p. 219°–220° C.

PREPARATION EXAMPLE 4

Preparation of Dye-Providing Compound (21)

Dye-providing compound (21) was prepared in the same manner as in Preparation Example 3 except that in the step (3-a) acetic anhydride was used in place of benzoyl chloride and in the step (3-b) a solution of 2-benzenesulfonyl-4-methanesulfonylaniline diazonium was used in place of the solution of 2,4-dimethanesulfonylaniline diazodium. The melting point of the product obtained was 231°–233° C.

PREPARATION EXAMPLE 5

Preparation of Image Forming Dyes

In order to examine hue of cyan image-forming dyes, various dyes were prepared by the usual azo coupling method. The results are shown in Tables 1 to 3.

TABLE 1 structure: naphthalene with OH, NHCOR¹, R², N=N—Ar

| $R^1$ | $R^2$ | Ar | $\lambda_{max}$ (nm) when Mordanted to Quaternary Ammonium Salt Polymer |
|---|---|---|---|
| —CH$_3$ | —NHSO$_2$CH$_3$ | phenyl with —SO$_2$CH$_3$ and —SO$_2$CH$_3$ | 627 |
| —Ph | —NHSO$_2$CH$_3$ | phenyl with —SO$_2$CH$_3$ and —SO$_2$CH$_3$ | 632 |
| —N—(C$_2$H$_5$)$_2$ | —NHSO$_2$CH$_3$ | phenyl with —SO$_2$CH$_3$ and —SO$_2$CH$_3$ | 627 |
| —NHPh | —NHSO$_2$CH$_3$ | phenyl with —SO$_2$CH$_3$ and —SO$_2$CH$_3$ | 626 |

TABLE 1-continued

[Structure: 1-hydroxy-2-(NHCOR¹)-4-(N=N-Ar)-5-R²-naphthalene]

| R¹ | R² | Ar | λmax (nm) when Mordanted to Quaternary Ammonium Salt Polymer |
|---|---|---|---|
| —CH₃ | —NHSO₂CH₃ | phenyl with CN, SO₂CH₃, SO₂CH₃ | 625 |
| —CH₃ | H | phenyl with SO₂CH₃, SO₂CH₃ | 627 |
| —CH₃ | —NHCOC₃H₇ | phenyl with SO₂CH₃, SO₂CH₃ | 627 |
| —CH₃ | H | phenyl with Cl, SO₂CH₃, SO₂CH₃ | 626 |
| —Ph | —NHCOC₃H₇ | phenyl with Cl, SO₂CH₃, SO₂CH₃ | 628 |
| —Ph | —NHSO₂CH₃ | phenyl with Cl, SO₂CH₃, SO₂CH₃ | 627 |
| 2-Cl-phenyl | —NHSO₂CH₃ | phenyl with SO₂CH₃, SO₂CH₃ | 630 |
| 4-CH₃-phenyl | —NHSO₂CH₃ | phenyl with SO₂CH₃, SO₂CH₃ | 632 |

TABLE 1-continued

Structure: naphthalene with OH, NHCOR¹, R², N=N—Ar substituents

| R¹ | R² | Ar | λmax (nm) when Mordanted to Quaternary Ammonium Salt Polymer |
|---|---|---|---|
| —C₆H₄—OCH₃ (para) | —NHSO₂CH₃ | phenyl with SO₂CH₃ and SO₂CH₃ | 634 |
| —C₆H₄—OCH₃ (ortho) | —NHSO₂CH₃ | phenyl with SO₂CH₃ and SO₂CH₃ | 629 |
| —Ph | —NHCOC₃H₇ | phenyl with SO₂CH₃ and SO₂CH₃ | 629 |

TABLE 2

Structure: naphthalene with OH, R, CH₃SO₂NH, N=N-aryl(SO₂CH₃)(SO₂CH₃)

| R | λmax (nm) |
|---|---|
| H | 602 |
| —SO₂NHC₄H₉(t) | 607 |

TABLE 3

Structure: naphthalene with OH, R, N=N-aryl(SO₂CH₃)(SO₂CH₃)

| R | λmax (nm) |
|---|---|
| —CONH—C₆H₃(OC₂H₄OCH₃)(SO₂NH₂) | 560 |

TABLE 3-continued

Structure: naphthalene with OH, R, N=N-aryl(SO₂CH₃)(SO₂CH₃)

| R | λmax (nm) |
|---|---|
| (unspecified) | 596 |
| —SO₂NH—C₆H₃(OC₂H₄OCH₃)(SO₂NH₂) | — |

It can be seen from the results shown in Tables 1 to 3 that the introduction of an acylamino group in the 2-position of naphthol results in a shift of the absorption maximum to the long wavelength region by more than 20 nm as compared with cases in which naphthol is not substituted or substituted with an electron attractive group such as a carbamoyl group or a sulfamoyl group in the 2-position thereof. Thus, all the dyes shown in Table 1 have a cyan hue.

The description "in a positive or negative relation to a latent image imagewise formed in the light-sensitive silver salt layer" used herein is explained as follows.

When a negative type silver halide emulsion is used in conjunction with Compound (1) having Y represented by general formula (IV), silver halide is reduced in a latent image pattern and Compound (1) is oxidized in the same pattern, releasing a dye; that is, the dye is released corresponding to the latent image formed in the light-sensitive silver salt layer. Since the dye does not contain a ballast group, a difference in diffusibility exists between Compound (1) and the dye, as a result of which only the dye thus released migrates to a dye-fixing layer, forming a color image in a positive relation to the latent image.

In contrast, when a positive type silver halide emulsion is used in place of the negative type silver halide emulsion, the dye is released in a negative relation to the latent image. Moreover, when compounds having Y represented by the general formula (IX) are used and a developing agent is used separately, the dye is released in a negative relation to the latent image even if negative type silver halide emulsions are used.

As described above, depending on the type of the emulsion or dye-providing compound, a dye image is formed either in a positive relation or in a negative relation to the latent image formed in the light-sensitive silver salt layer.

The light-sensitive material of the present invention comprises a plate-like material which is not subject to serious dimensional changes during the processing (more specifically, a photographic support) and at least one light-sensitive silver salt layer containing the dye-providing compound of the present invention as coated, directly or indirectly, on the plate-like material.

In a preferred multilayer structure, a blue-sensitive combination unit, a green-sensitive combination unit, and a red-sensitive combination unit are provided on the plate-like material in this order from the direction of light-exposure. In particular, when high sensitivity silver salt emulsions are used in these combination units, it is preferred that a yellow filter layer be provided between the blue-sensitive and green-sensitive combination units.

The yellow filter layer contains yellow colloidal silver dispersions, oil-soluble yellow dye dispersions, acidic dyes mordanted to basic polymers, or basic dyes mordanted to acidic polymers.

It is advantageous that the combination units be separated from each other by an intermediate layer. This intermediate layer prevents undesirable interactions from occurring between combination units having different color sensitivities. The intermediate layer is composed of one or more of, e.g., hydrophilic polymers such as gelatin, polyacrylamide, and partially hydrolyzed products of polyvinyl acetates, polymers containing fine pores as described in U.S. Pat. No. 3,625,685 which are prepared from latexes of hydrophilic and hydrophobic polymers, and polymers as described in U.S. Pat. No. 3,384,483 (e.g., clacium alginate) which have gradually increased hydrophilic properties under the action of a processing composition.

In order to prevent the diffusion of oxidation product of a developing agent to the outside of each combination unit, compounds capable of immobilizing the oxidation product of developing agent, such as color mixing-preventing agents (e.g., 2,5-di(sec-dodecyl)hydroquinone), may be incorporated in the intermediate layer.

In a preferred embodiment of the light-sensitive material of the present invention, the silver salt for use in the silver salt layer is silver halide, and the material is used at temperatures below 80° C., preferably 40° C. or lower.

A silver halide emulsion as used herein is a hydrophilic colloidal dispersion of silver chloride, silver bromide, silver chlorobromide, silver iodobromide, silver chloroiodobromide or a mixture thereof. The halogen composition is selected depending on the purpose for which the light-sensitive material is used and processing conditions. Particularly preferred are a silver bromide emulsion and a silver iodobromide or silver chloroiodobromide emulsion in which the iodide content is from 1 to 10 mol%, the chloride content is not more than 30 mol%, and the remainder is bromide.

In the present invention, emulsions may be used in which a latent image is easily formed on the particle surface, including direct positive emulsions as well as internal latent image type emulsion described in U.S. Pat. Nos. 2,592,550 and 3,206,313 can be used.

The silver halide emulsion as used herein may be extended in its color sensitivity by application of spectral sensitizing dyes, if desired.

The dye-providing compound as used herein can be dispersed in a hydrophilic colloid as a carrier in any suitable conventional manner depending on the type thereof. For example, if the compound contains a dissociative group such as a sulfo group and a carboxyl group, it is dissolved in water or an alkaline aqueous solution and then added to a hydrophilic colloidal solution. In the case of dye-releasing redox compounds which are sparingly soluble in aqueous media, but easily soluble in organic solvents, they are added to a hydrophilic colloidal solution in an organic solvent and dispersed therein as fine particles by techniques such as stirring. Details of these dispersing methods are described in U.S. Pat. Nos. 2,322,027, 2,801,171, 2,949,360 and 3,396,027.

In order to stabilize the dispersion of the dye-providing compound and to accelerate the formation of a dye image, it is advantageous that the dye-providing compound be dissolved in a high boiling solvent substantially immiscible with water and having a boiling point of more than about 200° C. at atmospheric pressure and then incorporated in the light-sensitive element. High boiling solvents which are suitable for this purpose include aliphatic esters such as higher fatty acid triglycerides and dioctyl thiadipate; phthalic acid esters such as di-n-butyl phthalate; phosphoric acid esters such as tri-o-cresyl phosphate and tri-n-hexyl phosphate; amides such as N,N-diethyllaurylamide; and hydroxy compounds such as 2,4-di-n-amylphenol.

Furthermore, to stabilize the dispersion of the dye-providing compound and accelerate the formation of a dye image, it is advantageous that polymers compatible with the solvents be incorporated in the light-sensitive sheet in combination with the dye-providing compound. Polymers compatible with solvents which are suitable for this purpose include shellac, phenol/formaldehyde condensates, poly-n-butyl acrylate, n-butyl acrylate/acrylic acid copolymers, and copolymers of n-butyl acrylate, styrene and methacrylamide. These polymers may be dissolved in an organic solvent in combination with the dye-providing compound and then dispersed in a photographic hydrophilic colloid such as gelatin, or alternatively may be converted into a hydrosol by techniques such as emulsion polymerization and then added to a hydrophilic colloidal dispersion of the dye-providing compound as the hydrosol.

Dispersion of the dye-providing compound is considerably accelerated by the use of surface active agents as emulsification aids. Surface active agents which are useful for the dispersion of the dye-providing compound as used herein include sodium triisopropylnaphthalene sulfonate, sodium dinonylnaphthalenesulfonate, sodium p-dodecylbenzenesulfonate, dioctyl dioctylsulfosuccinate, sodium cetylsulfate and anionic surface active agents as described in Japanese Patent Publication No. 4293/64 and British Pat. No. 1,138,514. Use of these anionic surface active agents in combination with higher fatty acid esters of anhydrohexytol provides an especially high emulsification ability as described in U.S. Pat. No. 3,676,141. In addition, dispersing methods described in Japanese Patent Publication No. 13837/68, U.S. Pat. Nos. 2,992,104, 3,044,873, 3,061,428 and 3,832,173 are effective in dispersing the compounds of the present invention.

One process for forming a color diffusion transfer image using the dye-providing compound of the present invention involves the following steps.

(A) A light-sensitive sheet comprising a support and at least one light-sensitive silver halide emulsion layer (hereinafter referred to as a "light-sensitive element") provided on the support, said emulsion layer containing the dye-providing compound of the present invention, is exposed imagewise.

(B) An alkaline processing composition is contacted with the light-sensitive silver halide emulsion layer to develop each light-sensitive silver halide in the presence of a silver halide developing agent.

(C) An oxidized product of the developing agent is formed according to exposure as a result of development and cross-oxidizes the dye-providing compound.

(D) The oxidized dye-providing compound is cleaved, thereby resulting in release of a diffusible dye.

(E) The dye released diffuses in an imagewise pattern, thereby forming a transfer image on an image-receiving layer in contact with the light-sensitive layer, directly or through another layer.

In the above-described process, any silver halide developing agents can be used as long as they are capable of cross-oxidizing the dye-providing compounds. These developing agents may be incorporated in the alkaline processing composition or in a suitable layer of the light-sensitive element.

Examples of developing agents which can be used in the present invention are: hydroquinones; aminophenols such as N-methylaminophenol; pyrazolidones such as phenidone, 1-phenyl-3-pyrazolidone, dimezones (1-phenyl-4,4-dimethyl-3-pyrazolidone), and 1-phenyl-4-methyl-4-oxymethyl-3-pyrazolidone; and phenylenediamines such as N,N-diethyl-p-phenylenediamine, 3-methyl-N,N-diethyl-p-phenylenediamine, and 3-methoxy-N-ethoxy-p-phenylenediamine.

Of these compounds, black-and-white developing agents generally having an ability to reduce the formation of stain in the image-receiving layer are especially preferred rather than color developing agents such as phenylenediamines.

With regard to the image-receiving layer, a suitable neutralizing layer, a neutralization speed-controlling layer (a timing layer), processing composition, and other optional components are described in Japanese Patent Application (OPI) No. 149328/78.

The photographic light-sensitive sheet of the present invention is preferably included in a photographic film unit, that is, a film unit designed so that the light-sensitive sheet can be photographically processed by exposing it imagewise and then passing it between a pair of pressing members arranged in parallel with each other.

One of the integrated type film unit which is most suitable for applying the light-sensitive sheet of the present invention is disclosed in Belgian Pat. No. 757,959. In this film unit, a image-receiving layer, a substantially opaque light-reflective layer (e.g., a $TiO_2$ layer and a carbon black layer), and one or more light-sensitive layers as described above are coated on a transparent support in this sequence and, furthermore, a transparent cover sheet is superposed thereon in a face-to-face relation. A rupturable container containing an alkaline processing composition which contains an opacifying agent (e.g., carbon black) for shielding light is arranged adjacent to the uppermost layer of the light-sensitive layers (i.e., a protective layer) and the transparent cover sheet. This film unit is exposed to light through the transparent cover sheet and when it is taken out of a camera, the container is broken by means of the pressing members, thereby extending the processing composition (containing the opacifying agent) uniformly between the light-sensitive layer and the cover sheet. Thus, the light-sensitive element is shielded from light as a "sandwich" and developed in a light place.

Film units of this type as described above preferably contain a neutralization mechanism. It is particularly preferred that the cover sheet be provided with a neutralizing layer and, if desired, with a timing layer on the side in contact with the processing composition.

Other useful integrated type embodiments in which the dye-providing compounds of the present invention can be used are described in U.S. Pat. Nos. 3,415,644, 3,415,645, 3,415,646, 3,647,487 and 3,635,707 and German Patent Application (OLS) No. 2,426,980.

In another preferred embodiment, the light-sensitive material of the present invention is intended to be used at elevated temperatures (80° C. or more). In this case, the silver salt used is preferably silver halide and/or an organic silver salt oxidizing agent, or silver halide and/or an inorganic silver salt oxidizing agent. The term "organic silver salt oxidizing agent" as used herein means an organic silver salt capable of being converted into an oxidizing agent. The term "inorganic silver salt oxidizing agent" as used herein has the same meaning as described above.

The dye-providing compound of the present invention can be incorporated in a layer or layers of the light-sensitive material by known procedures such as described in U.S. Pat. No. 2,322,027, in which high boiling and low boiling organic solvents can be used.

Suitable high boiling organic solvents include phthalic acid alkyl esters (e.g., dibutyl phthalate and dioctyl phthalate), phosphoric acid esters (e.g., diphenyl phosphate, triphenyl phosphate, tricresyl phosphate, and dioctylbutyl phosphate), citric acid esters (e.g., tributyl acetylcitrate), benzoic acid esters (e.g., octyl benzoate), alkylamides (e.g., diethyllaurylamide), fatty acid esters (e.g., dibutoxyethyl succinate and dioctyl azelate), and trimesinic acid esters (e.g., tirubtyl trimesinate), and low boiling organic solvents include those having a boiling point of from about 30° to 160° C., such as lower alkyl acetate (e.g., ethyl acetate and butyl acetate), ethyl propionate, sec-butyl alcohol, methyl isobutyl ketone, β-ethoxyethyl acetate, methyl cellosolve acetate, and cyclohexanone.

These high boiling and low boiling organic solvents may be used in combination with each other.

The dye-providing compound of the present invention is dissolved in an organic solvent as described above and then dispersed in a hydrophilic colloid.

A dispersion method utilizing polymers described in Japanese Patent Publication No. 39853/76 and Japanese Patent Application (OPI) No. 59943/76 can also be employed.

In dispersing the dye-providing compound in a hydrophilic colloid, the surface active agents described above can be used.

The amount of the high boiling organic solvent used is about 10 g or less, preferably about 5 g or less per gram of the dye-providing compound.

Reducing agents which can be used in the present invention include hydroquinone compounds (e.g., hydroquinone, 2,5-dichlorohydroquinone, and 2-chlorohydroquinone), aminophenol compounds (e.g., 4-aminophenol, N-methylaminophenol, 3-methyl-4-aminophenol, and 3,5-dibromoaminophenol), catechol compounds (e.g., catechol, 4-cyclohexylcatechol, 3-methoxycatechol, and 4-(N-octadecylamino)catechol), and phenylenediamine compounds (e.g., N,N-diethyl-p-phenylenediamine, 3-methyl-N,N-diethyl-p-phenylenediamine, 3-methoxy-N-ethyl-N-ethoxy-p-phenylenediamine, and N,N,N',N'-tetramethyl-p-phenylenediamine).

Preferred reducing agents include 3-pyrazolidone compounds (e.g., 1-phenyl-3-pyrazolidone, 1-phenyl-4,4-dimethyl-3-pyrazolidone, 4-hydroxymethyl-4-methyl-1-phenyl-3-pyrazolidone, 1-m-tolyl-3-pyrazolidone, 1-p-tolyl-3-pyrazolidone, 1-phenyl-4-methyl-3-pyrazolidone, 1-phenyl-5-methyl-3-pyrazolidone, 1-phenyl-4,4-bis(hydroxymethyl)-3-pyrazolidone, 1,4-dimethyl-3-pyrazolidone, 4-methyl-3-pyrazolidone, 4,4-dimethyl-3-pyrazolidone, 1-(3-chlorophenyl)-4-methyl-3-pyrazolidone, 1-(4-chlorophenyl)-4-methyl-3-pyrazolidone, 1-(4-tolyl)-4-methyl-3-pyrazolidone, 1-(2-tolyl)-4-methyl-3-pyrazolidone, 1-(4-tolyl)-3-pyrazolidone, 1-(3-tolyl)-3-pyrazolidone, 1-(3-tolyl)-4,4-dimethyl-3-pyrazolidone, 1-(2-trifluoroethyl)-4,4-dimethyl-3-pyrazolidone, and 5-methyl-3-pyrazolidone).

Various developing agent combinations described in U.S. Pat. No. 3,039,869 can also be employed.

The amount of the reducing agent added is from about 0.01 to 20 mols, more preferably from about 0.1 to 10 mols per mol of silver.

In the present invention, even when reducing dye-providing compounds are used, so-called auxiliary developing agents can be used, if necessary. These auxiliary developing agents are oxidized by silver halide, their oxidized products having the ability to oxidize a reducing substrate in the dye-providing compound.

Useful auxiliary developing agents include hydroquinone; alkyl substituted hydroquinones such as tert-butylhydroquinone and 2,5-dimethylhydroquinone; catechols; pyrogallols; halogen substituted hydroquinones such as chlorohydroquinone and dichlorohydroquinone; alkoxy substituted hydroquinones such as methoxyhydroquinone; and polyhydroxybenzene derivatives such as methylhydroxynaphthalene. In addition, methyl gallate, ascorbic acid, ascorbic acid derivatives, hydroxylamines (e.g., N,N'-di(2-ethoxyethyl)hydroxylamine), pyrazolidones (e.g., 1-phenyl-3-pyrazolidone, and 4-methyl-4-hydroxymethyl-1-phenyl-3-pyrazolidone), reductones, and hydroxytetronic acids are useful.

The amount of the auxiliary developing agent used is preferably from about 0.0005 to 20 mols, more preferably from about 0.001 to 4 mols, per mol of silver.

Silver halide as used in this embodiment includes silver chloride, silver chlorobromide, silver chloroiodide, silver bromide, silver iodobromide, silver chloroiodobromide, and silver iodide.

If the silver halide is used alone, that is, without also using an organic silver salt oxidizing agent, it is particularly preferred that the silver halide contain a pure silver iodide crystal as one silver halide component. That is, it is particularly preferred that a pure silver iodide pattern appear in an X-ray diffraction spectrum of the silver halide used.

In the photographic light-sensitive material silver halide containing at least two types of halogen atoms is generally used. In the usual silver halide emulsion, the silver halide grains are completely mixed crystals. In an X-ray diffraction analysis of silver iodobromide grains in a silver iodobromide emulsion, for example, the characteristic patterns of pure silver iodide and silver bromide crystals do not appear, but a pattern appears corresponding to the mixing ratio of silver iodide and silver bromide crystals.

Silver halide which is most preferably used in the present invention contains silver iodide crystals in the grains thereof. That is, it includes silver chloroiodide, silver iodobromide and silver chloroiodobromide having X-ray diffraction spectra in which a silver iodide crystal pattern appears.

In a particularly preferred embodiment of the present invention, silver halide and an organic silver salt oxidizing agent are used in combination. This organic silver salt oxidizing agent, when heated to more than 80° C., preferably to more than 100° C. in the presence of exposed silver halide, reacts with the dye-providing compound or a reducing agent which is, if necessary, added to the dye-providing compound, thereby forming a silver image. The use of such organic silver salt oxidizing agents in combination permits the production of a light-sensitive material forming a dye image of high density.

In this embodiment, it is not necessary that the silver halide contain pure silver iodide crystals that are required when the silver halide is used alone. All silver halides known in the art can be used in this embodiment of the present invention.

Examples of organic silver salt oxidizing agents are silver salts of organic compounds containing a carboxyl group, typical examples of which are silver salts of aliphatic carboxylic acids and aromatic carboxylic acids.

These aliphatic carboxylic acids include behenic acid, stearic acid, oleic acid, lauric acid, capric acid, myristic acid, palmitic acid, maleic acid, fumaric acid, tartaric acid, Freund's acid, linoleic acid, oleic acid, adipic acid, sebacic acid, succinic acid, acetic acid, butyric acid, and camphoric acid. Compounds in which the silver salts of such aliphatic carboxylic acids are substituted with a halogen atom or a hydroxyl group are also effective.

Aromatic carboxylic acids and other carboxyl group-containing compounds include benzoic acid, 3,5-dihydroxybenzoic acid, o-methylbenzoic acid, m-methylbenzoic acid, p-methylbenzoic acid, 2,4-dichlorobenzoic acid, acetamidobenzoic acid, p-phenylbenzoic acid and other substituted benzoic acids, gallic acid, tannic acid, phthalic acid, terephthalic acid, salicylic acid, phenylacetic acid, pyromellitic acid, 3-carboxymethyl-4-methyl-4-thiazoline-2-thione and the like described in U.S. Pat. No. 3,785,830, and aliphatic carboxylic acids containing a thioether group as described in U.S. Pat. No. 3,330,663.

In addition, silver salts of compounds containing a mercapto group or a thione group and their derivatives can be used, for example, a silver salt of 3-mercapto-4-phenyl-1,2,4-triazole, a silver salt of 2-mercaptobenzimidazole, a silver salt of 2-mercapto-5-aminothiadiazole, a silver salt of 2-mercaptobenzothiazole, a silver salt of 2-(s-ethylglycolamido)benzothiazole, silver salts of thioglycolic acids, such as s-alkylthioglycolacetic acid (in which the number of carbon atoms of the alkyl group is from 12 to 22), described in Japanese Patent Application (OPI) No. 28221/73, silver salts of dithiocarboxylic acids such as dithioacetic acid, a silver salt of thioamide, a silver salt of 5-carboxy-1-methyl-2-phenyl-4-thiopyridine, a silver salt of mercaptotriazine, a silver salt of 2-mercaptobenzooxazole, a silver salt of mercaptooxadiazole, silver salts described in U.S. Pat. No. 4,123,274, such as a silver salt of 3-amino-5-benzylthio-1,2,4-triazole which is derived from 1,2,4-mercaptotriazole, and silver salts of thione compounds, such as a silver salt of 3-(2-carboxyethyl)-4-methyl-4-thiazoline-2-thione described in U.S. Pat. No. 3,301,678.

In addition, silver salts of compounds containing an imino group can be used, including silver salts of benzotriazole and its derivatives described in Japanese Patent Publication Nos. 30270/69 and 18416/70, silver salts of alkyl-substituted benzotriazoles such as benzotriazole and methylbenzotriazole, silver salts of halogen-substituted benzotriazoles such as 5-chlorobenzotriazole, silver salts of carboimidobenzotriazoles such as butylcarboimidobenzotriazole, a silver salt of 1,2,4-triazole or 1-H-tetrazole as described in U.S. Pat. No. 4,220,709, a silver salt of carbazole, a silver salt of saccharin, and silver salts of imidazole and its derivatives.

In addition, silver salts and organic metallic salts, such as copper stearate, described in *Research Disclosure*, Vol. 170, No. 17029 (June, 1978) can be used in the present invention.

These organic silver salt oxidizing agents can be used alone or in combination with each other.

Although the mechanism of heat development in the present invention is not clear, it is believed to proceed as follows.

Upon irradiation of a light-sensitive material with light, a latent image is formed in the light-sensitive silver halide as described in H. James, *The Theory of the Photographic Process*, 3rd Edition, pp. 105–148.

On heating the light-sensitive material, a reducing agent or a dye-providing compound of the present invention is oxidized and thereby reduces silver halide or silver halide and an organic silver salt, with the latent image nucleus acting as a catalyst, thereby forming silver. This oxidized dye-providing compound either (1) is cleaved to release the dye or (2) prevents release of the dye. Alternatively, as a result of a redox reaction involving the remaining excess reducing agent, the dye-providing compound of the present invention is reduced, thereby releasing the dye.

Techniques for preparation of such silver halide or organic silver salts and a method of mixing them are described in *Research Disclosure*, No. 170, 17029, Japanese Patent Application (OPI) Nos. 32928/75, 42529/76, 13224/74, 17216/75 and U.S. Pat. No. 3,700,458.

The amount of light-sensitive silver halide or organic silver salt coated is from about 50 to 10 mg/m$^2$ calculated as silver.

The light-sensitive silver halide and organic silver salt oxidizing agent as used herein are dispersed in binders, along with the dye-providing compound.

Binders can be used alone or in combination with each other. Typical examples of hydrophilic binders which can be used include transparent or translucent hydrophilic colloids, including natural substances such as proteins (e.g., gelatin, gelatin derivatives, and cellulose derivatives), and polysaccharides (e.g., starch and gum arabic), and synthetic polymeric substances such as water-soluble vinyl polymers (e.g., polyvinyl pyrrolidone or an acrylamide polymer). Other synthetic polymeric substances may be used as a latex, including vinyl compounds in a dispersion which increases the dimensional stability of the photographic material.

The silver halide used herein may be spectrally sensitized with methine dyes, for example, cyanine dyes, merocyanine dyes, complex cyanine dyes, complex merocyanine dyes, holopolar cyanine dyes, hemicyanine dyes, styryl dyes, and hemioxonol dyes. Particularly useful dyes are those belonging to cyanine dyes, merocyanine dyes, and complex merocyanine dyes. In these dyes, any nuclei which are commonly utilized in cyanine dyes as basic heterocyclic nuclei can be used, including a pyrroline nucleus, an oxazolidine nucleus, a thiazoline nucleus, a pyrrole nucleus, an oxazole nucleus, a thiazole nucleus, a selenazole nucleus, an imidazole nucleus, a tetrazole nucleus, or a pyridine nucleus; nuclei resulting from the fusion of alicyclic hydrocarbon rings to the foregoing nuclei; and nuclei resulting from the fusion of aromatic hydrocarbon rings to the foregoing nuclei, such as an indolenine nucleus, a benzindolenine nucleus, an indole nucleus, a benzoxazole nucleus, a naphthooxazole nucleus, a benzoselenazole nucleus, a benzindazole nucleus, and a quinoline nucleus. These nuclei may be substituted at the carbon atom.

In merocyanine dyes or complex merocyanine dyes, the nucleus of the ketomethylene structure can include 5- to 6-membered heterocyclic nuclei such as a pyrazoline-5-one nucleus, a thiohydantoin nucleus, a 2-thiooxazolidine-2,4-dione nucleus, a thiazolidine-2,4-dione nucleus, a rhodanine nucleus, and a thiobarbituric acid nucleus.

Useful sensitizing dyes are described in, for example, German Pat. No. 929,080, U.S. Pat. Nos. 2,231,658, 2,493,748, 2,503,776, 2,519,001, 2,912,329, 3,656,959, 3,672,897, 3,694,217, 4,025,349 and 4,046,572, British Pat. No. 1,242,588 and Japanese Patent Publication Nos. 14030/79 and 24844/77.

These sensitizing dyes may be used alone or in combination with each other. Combinations of such sensitizing dyes are often used for the purpose of supersensitization. Typical examples of such combinations are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862 and 4,026,707, British Patent Nos. 1,344,281 and 1,507,803, Japanese Patent Publication Nos. 4936/68, 12375/78, Japanese Patent Application (OPI) Nos. 110618/77 and 109925/77.

Dyes which do not themselves have a spectral sensitization capacity, or substances which do not substantially absorb visible light but cause supersensitization may be incorporated in the emulsion in combination with sensitizing dyes. For example, aminostyryl compounds substituted with a nitrogen-containing heterocyclic group (as described, for example, in U.S. Pat. Nos. 2,933,390 and 3,635,721), aromatic organic acid/formaldehyde condensates (as described in, for example, U.S. Pat. No. 3,743,510), cadmium salts, and azaindene compounds may be incorporated. Particularly useful are the combinations described in U.S. Pat. Nos. 3,615,613, 3,615,641, 3,617,295 and 3,635,721.

Supports for use in the light-sensitive material of the present invention and in an optional dye-fixing material should be durable at the processing temperature. Commonly used supports include glass, paper, metal and similar materials, acetyl cellulose film, cellulose ester film, polyvinyl acetal film, polystyrene film, polycarbonate film, polyethylene terephthalate film, and composite films or materials. In addition, a paper support with a polymer (e.g., polyethylene) film laminated thereon can be used. Polyesters described in U.S. Pat. Nos. 3,634,089 and 3,725,070 are preferably used.

Various dye-releasing aids can be used in the present invention. A dye-releasing aid is a compound which can accelerate the redox reaction of light-sensitive silver halide and/or an organic silver salt oxidizing agent with a dye-providing compound, or can act nucleophilically on a dye-providing compound which has been oxidized through the dye release reaction that occurs following the redox reaction, thereby accelerating dye release. As such dye-releasing aids, bases or their precursors can be used. In the present invention, it is particularly advantageous to use such dye-releasing aids for the purpose of acceleration of the reaction.

Preferred examples of these bases are amines, such as trialkylamines, hydroxylamines, aliphatic polyamines, N-alkyl substituted aromatic amines, N-hydroxyalkyl substituted aromatic amines, and bis[p-(dialkylamino)phenyl]methanes. In addition, betaine tetramethylammonium iodide and diaminobutanedihydro chloride described in U.S. Pat. No. 2,410,644, and organic compounds containing an amino acid such as urea and 6-aminocaproic acid described in U.S. Pat. No. 3,506,444 are useful. Base precursors such as those described in British Pat. No. 998,949 release a basic component on heating. Preferred base precursors are salts of carboxylic acids and organic bases. Useful carboxylic acids are trichloroacetic acid and trifluoroacetic acid, and useful bases are guanidine, piperidine, morpholine, p-toluidine, 2-picolin, and the like. Guanidine trichloroacetic acid described in U.S. Pat. No. 3,220,846 is particularly useful. In addition, aldonamides described in Japanese Patent Application (OPI) No. 22625/75 are preferably used since they decompose at elevated temperatures, thereby forming a base.

The amount of the dye-releasing aid used varies over a wide range, and is not more than about 50% by weight based on the weight of the dry coating films of the light-sensitive material, with the range of from about 0.01 to 40% by weight being preferred.

In the heat-developable color light-sensitive material of the present invention, it is advantageous to include compounds represented by general formula (XVII) as shown below, since they accelerate development and further the release of dye.

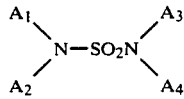
(XVII)

wherein $A_1$, $A_2$, $A_3$ and $A_4$ may be the same or different and are each a hydrogen atom, an alkyl group, a substituted alkyl group, a cycloalkyl group, an aralkyl group, an aryl group, a substituted aryl group, or a heterocyclic radical, and $A_1$ and $A_2$ or $A_3$ and $A_4$ may combine together to form a ring.

Representative examples of the compounds of general formula (XVII) are $H_2NSO_2NH_2$, $H_2NSO_2N(CH_3)_2$, $H_2NSO_2N(C_2H_5)_2$, $H_2NSO_2NHCH_3$, $H_2NSO_2N(C_2H_4OH)_2$, $CH_3NHSO_2NHCH_3$, and

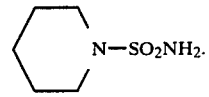

The compound represented by general formula (XVII) can be used over a wide range, and is not more than about 20% by weight based on the weight of the dry coating films of the light-sensitive material, with the range of from about 0.1 to 15% by weight being preferred.

In the present invention, water-releasing compounds are advantageously used, since they accelerate the dye release reaction.

A water-releasing compound is a compound which decomposes during heat development to release water. These compounds are known in the field of transfer dyeing of fibers. Particularly useful are compounds such as $NH_4Fe(SO_4)_2.12H_2O$ and the like described in Japanese Patent Application (OPI) No. 88386/75.

In the present invention, compounds capable of stabilizing images simultaneously with development can be used. Of these compounds, isothiuroniums exemplified by 2-hydroxyethylisothiuronium.trichloroacetate described in U.S. Pat. No. 3,301,678, bis-isothiuroniums such as 1,8-(3,6-dioxaoctane)-bis(isothiuronium.trifluoroacetate) described in U.S. Pat. No. 3,669,670, thiol compounds described in West German Patent (OLS) No. 2,162,714, thiazolium compounds such as 2-amino-2-thiazolium.trichloroacetate and 2-amino-5-bromoethyl-2-thiazolium.trichloroacetate described in U.S. Pat. No. 4,012,260, compounds containing α-sulfonyl acetate as an acidic component, such as bis(2-amino-2-thiazolium)methylenebis(sulfonylacetate) and 2-amino-2-thiazoliumphenylsulfonyl acetate described in U.S. Pat. No., 4,060,420, and compounds containing 2-carboxycarboxyamide as an acidic component described in U.S. Pat. No. 4,088,496 are preferably used.

In a preferred embodiment of the present invention, a thermal solvent can be incorporated. A thermal solvent is a non-hydrolyzable organic material which is solid at ambient temperature, but combines with another component at the heat processing temperature or a temperature lower than the heat processing temperature, and has a mixed melting point. As thermal solvents, compounds which are used as solvents for developing agents, and compounds which are of high dielectric constant and are known to accelerate physical development of a silver salt are useful. Useful thermal solvents include polyglycols such as polyethylene glycol having an average molecular weight of from about 1,500 to 20,000 and oleic acid esters of polyethylene oxide described in U.S. Pat. No. 3,347,675, beeswax, monostearin, compounds of high dielectric constant containing —$SO_2$— or —CO—, such as acetamide, succinimide, ethylcarbamate, urea, methylsulfonamide, and ethylene carbonate, polar substances described in U.S. Pat. No. 3,667,959, lactone of 4-hydroxybutanic acid, methylsulfinylmethane, tetrahydrothiophen-1,1-dioxide, and 1,10-decanediol, methyl anisate and biphenyl suberate described in *Research Disclosure*, pp. 26–28 (December, 1976).

In the present invention, the dye-providing compounds is colored and it is not necessary to incorporate anti-irradiation or antihalation substances or dyes in the light-sensitive material. However, in order to increase sharpness, filter dyes and absorbing substances described in Japanese Patent Publication No. 3692/73, U.S. Pat. Nos. 3,253,921, 2,527,583 and 2,956,879 can be incorporated in the light-sensitive material. It is preferred for these dyes to lose their color on heating. For example, dyes described in U.S. Pat. Nos. 3,769,019, 3,745,009 and 3,615,432 are preferably used.

The light-sensitive material used herein can contain, if necessary, various additives which are commonly used in heat-developable light-sensitive materials, and can include conventional layers other than the light-sensitive layer or layers, such as an antistatic layer, an electrically conductive layer, a protective layer, an intermediate layer, an antihalation (AH) layer, a stripping layer, and the like.

Photographic emulsion layers or other hydrophilic colloidal layers of the light-sensitive material of the present invention may contain surface active agents as coating aids or for various purposes, such as preventing charing, reducing friction, accelerating emulsification and dispersion, preventing adhesion, and improving photographic properties (e.g., acceleration of development, rendering high contrast, and sensitization).

Useful surface active agents include, for example:
saponin (steroid-based);
nonionic surface active agents such as alkylene oxide derivatives (e.g., polyethylene glycol, polyethylene glycol/polypropylene glycol condensates, polyethylene glycol alkyl ethers or polyethylene glycol alkylaryl ethers, polyethylene glycol esters, polyethylene glycol sorbitan esters, polyalkylene glycol alkylamines or amides, and polyethylene oxide adducts of silicone), glycidol derivatives (e.g., alkenylsuccinic acid polyglyceride and alkylphenol polyglyceride), fatty acid esters of polyhydric alcohols, and alkyl esters of saccharides;
anionic surface active agents containing an acidic group, such as a carboxyl group, a sulfo group, a phospho group, a sulfate, and a phosphate group, such as alkylcarboxylic acid salts, alkylsulfonic acid salts, alkylbenzenesulfonic acid salts, alkylnaphthalenesulfonic acid salts, alkylsulfuric acid esters, alkylphosphoric acid esters, N-acyl-N-alkyltaurines, sulfosuccinic acid esters, sulfoalkylpolyoxyethylene alkylphenyl ethers, and polyoxyethylene alkylphosphates;
amphoteric surface active agents such as amino acids, aminoalkylsulfonic acids, aminoalkylsulfuric acid or phosphoric acid esters, alkylbetaines, and amine oxides; and
cationic surface active agents such as alkylamine salts, aliphatic or aromatic quaternary ammonium salts, heterocyclic ring (e.g., pyridinium and imidazolium) quaternary ammonium salts, and phosphonium or sulfonium salts containing an aliphatic or heterocyclic group.

Of the above-described surface active agents, polyethylene glycol type nonionic surface active agents having a recurring unit of ethylene oxide in the molecule are preferred. Particularly preferred are those in which the number of recurring units of ethylene oxide is at least 5.

Nonionic surface active agents satisfying the above requirements are widely used in other technical fields and their structures, properties and methods of preparation are well known, as described in, for example, Martin J. Schick ed., *Surfactant Science Series*, Vol. 1, Nonionic Surfactants, (Marcel Dekker Inc. 1967), and Schoufeldt, *Surface Active Ethylene Oxide Adducts* (Pergamon Press, 1969). Nonionic surface active agents described in these references satisfying the above requirements are preferably used in the present invention.

These nonionic surface active agents can be used alone or as mixtures comprising two or more thereof.

The amount of the polyethylene glycol type nonionic surface active agent added is equal to or less than the weight of hydrophilic binder and preferably not more than 50% of the weight of the hydrophilic binder.

The light-sensitive material of the present invention may contain cationic compounds containing a pyridinium group, such as those described in *PSA Journal*, Section B, 36 (1953), U.S. Pat. Nos. 2,648,604, 3,671,247, Japanese Patent Publication Nos. 30074/69 and 9503/69.

The photographic light-sensitive material and dye-fixing material of the present invention may contain inorganic or organic hardening agents in the photographic emulsion layer and other binder layers thereof. For example, chromium salts (e.g., chromium alum and chromium acetate), aldehydes (e.g., formaldehyde, glyoxal, and glutaraldehyde), N-methylol compounds (e.g., dimethylolurea, and methyloldimethylhydantoin), dioxane derivatives (e.g., 2,3-dihydroxydioxane), active vinyl compounds (e.g., 1,3,5-triacryloylhexahydro-s-triazine, and 1,3-vinylsulfonyl-2-propanol), active halogen compounds (e.g., 2,4-dichloro-6-hydroxy-s-triazine), and mucohalogenic acids (e.g., mucochloric acid, and mucophenoxychloric acid), can be used alone or in combination with each other.

Other additives which can be used include plasticizers, sharpness-improving dyes, antihalation dyes, sensitizing dyes, matting agents, fluorescent whiteners, and anti-fading agents, which are described in *Research Disclosure*, Vol. 170 (June, 1978).

Various exposure techniques can be employed in the present invention. A latent image can be formed by imagewise exposure to radiation including visible light. In general, light sources which are conventional in color printing, such as a tungsten lamp, a mercury lamp, a halogen lamp (e.g., an iodine lamp), a laser light source, a CRT light source, a fluorescent tube, and a light-emitting diode can be used.

Originals which can be used include line images such as drawings, and conventional photographic images having gradation. Printing of originals may be contact printing in which the light-sensitive material is placed in contact with the original, reflective printing, or enlargement printing.

An image photographed with a video camera, for example, or image information sent from a television station displayed directly on a CRT or FOT can be focused on the heat developable light-sensitive material by contacting or by means of a lens and printed thereon.

A recently-developed light-emitting diode (LED) is being used as an exposure or display means in various devices. It is difficult to produce a light-emitting diode capable of efficiently producing blue light. In reproduction of color images utilizing LEDs, three types of LEDs emitting green, red and infrared light can be used in conjunction with light-sensitive layers sensitive to these colors and designed to release yellow, magenta and cyan dyes, respectively. That is, typically a green-sensitive layer contains a yellow dye-providing compound, a red-sensitive layer contains a magenta dye-providing compound, and an infrared light-sensitive layer contains a cyan dye-providing compound, although if desired other combinations can be employed.

In addition to the above method in which the original is contacted with or projected directly onto the light-sensitive material, a method can also be employed in which the original illuminated by means of a light source is recorded into the memory of, e.g., a reading computer by means of a light-receiving element, such as a photoelectric tube or CCD. This image information is subjected to image processing and is then reproduced by a CRT, and the reproduced image is utilized as an imagewise light source. Alternatively, according to the image information, three LEDs can be used as described above to expose the light-sensitive material according to the image information.

In a preferred embodiment of the present invention, the latent image formed by exposing imagewise the light-sensitive material can be developed by heating the light-sensitive material at elevated temperatures of from about 80° to 250° C. for from about 0.5 to 300 seconds. Lower and higher temperatures within the above temperature range can be employed, which can be attained by lengthening or shortening the heating time. Particularly preferred is a temperature range of from about 110° to 160° C.

Tht heating means used is not unduly limited, and includes any conventional means, such as a hot plate, an iron, a heat roller, or a heat generator utilizing carbon, titanium white and the like.

Formation of color images by heat development in the present invention is attained by migration of hydrophilic mobile dyes. Thus, the heat-developable light-sensitive material of the present invention comprises a support with at least a light-sensitive layer (I) and a dye-fixing layer (II) provided thereon, said layer (I) containing silver halide, a binder and, if desired, an organic silver salt oxidizing agent and a dye-providing compound, and said layer (II) being capable of receiving hydrophilic diffusible dyes.

The light-sensitive layer (I) and the dye-fixing layer (II) may be formed on the same support, or may be formed on different supports. The dye-fixing layer (II) can be separated from the light-sensitive layer (I). For example, after imagewise exposure followed by uniform heat development, the dye-fixing layer (II) or the light-sensitive layer (I) can be separated. When a light-sensitive material comprising the light-sensitive layer (I) coated on a support and a fixing material comprising the fixing layer (II) coated on a support are produced separately, the light-sensitive material is exposed imagewise and uniformly heated and, thereafter, the fixing material is superimposed on the light-sensitive material, so that the mobile dye can be transferred to the fixing layer (II).

A method can also be employed in which only light-sensitive material (I) is exposed imagewise and, thereafter, the dye-fixing layer (II) is superimposed thereon and uniformly heated.

The dye-fixing layer (II) may contain dye mordants for fixation of dyes. Various mordants can be used, of which polymeric mordants are particularly useful. In addition to such mordants, the dye-fixing layer (II) may contain bases, base precursors, and other conventional additives as desired, and thermal solvents. Particularly, when light-sensitive layer (I) and dye-fixing layer (II) are formed on different supports, it is preferred that bases or their precursors be included in dye-fixing layer (II).

Polymeric mordants which can be used in the present invention include polymers containing sec- and tert-amino groups, polymers having nitrogen-containing heterocyclic moieties, and polymers containing quaternary cationic groups, having a molecular weight of from about 5,000 to 200,000 and preferably from about 10,000 to 50,000.

Examples of these mordants are vinylpyridine polymers and vinylpyridinium cation polymers described in U.S. Pat. Nos. 2,548,564, 2,484,430, 3,148,061 and 3,756,814; polymer mordants cross-linkable with gelatin described in U.S. Pat. Nos. 3,625,694, 3,859,096, 4,128,538, and British Patent No. 1,277,453; aqueous sol-type mordants described in U.S. Pat. Nos. 3,958,995, 2,721,852, 2,798,063, Japanese Patent Application (OPI) Nos. 115228/79, 145529/79, and 126027/79; water-insoluble mordants described in U.S. Pat. No. 3,898,088; reactive mordants capable of covalent bonding with dyes described in U.S. Pat. No. 4,168,976 (corresponding to Japanese Patent Application (OPI) No. 137333/79); and mordants described in U.S. Pat. Nos. 3,709,690, 3,788,855, 3,642,482, 3,488,706, 3,557,066, 3,271,147, 3,271,148, Japanese Patent Application (OPI) Nos. 71332/75, 30328/78, 155528/77, 125/78 and 1024/78.

In addition, the mordants described in U.S. Pat. Nos. 2,675,316 and 2,882,156 can be used.

Of these mordants, mordants cross-linkable with a matrix of gelatin, for example, water-insoluble mordants, and aqueous sol or latex dispersion mordants are preferably used.

Particularly preferred polymer mordants are shown below.

(1) Polymers having a quaternary ammonium group and a group capable of covelent bonding with gelatin (e.g., an aldehyde group, a chloroalkanoyl group, a chloroalkyl group, a vinylsulfonyl group, a pyridinium propionyl group, a vinylcarbonyl group, and an alkylsulfoxy group)

A typical example has the following formula.

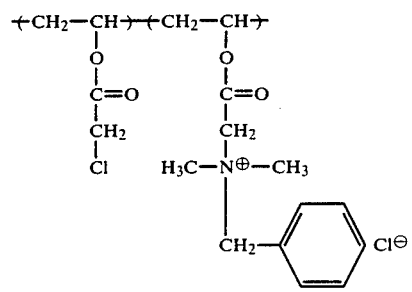

(2) Reaction products of copolymers comprising a recurring unit represented by the general formula as shown below and another ethylenically unsaturated monomer recurring unit, and cross-linking agents (e.g., bisalkane sulfonate and bisallene sulfonate)

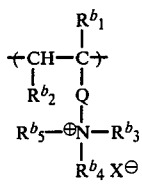

wherein:
$R^b_1$ is a hydrogen atom or an alkyl group;
$R^b_2$ is a hydrogen atom, an alkyl group, or an aryl group;
Q is a divalent group;
$R^b_3$, $R^b_4$ and $R^b_5$ are each an alkyl group, or an aryl group, and at least two or $R^b_3$ to $R^b_5$ may combine together to form a heterocyclic ring; and
X is an anion.

The alkyl and aryl groups can be unsubstituted or substituted.

(3) Polymers represented by the following general formula:

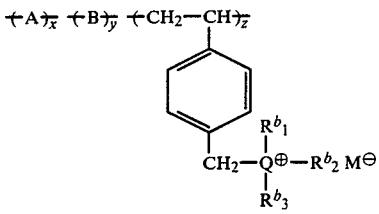

wherein:
x is from about 0.25 to about 5 mol%;
y is from about 0 to about 90 mol%;
z is from about 10 to about 99 mol%;
A is a monomer having at least two ethylenically unsaturated bonds;
B is a copolymerizable ethylenically unsaturated monomer;
Q is a nitrogen atom or a phosphorus atom; and
$R^b_1$, $R^b_2$ and $R^b_3$ are each an alkyl group or a cyclic hydrocarbon group, and at least two or $R^b_1$ to $R^b_3$ may combine together to form a ring. These groups and rings may be substituted.

(4) Copolymers of monomers (a), (b) and (c) as shown below.

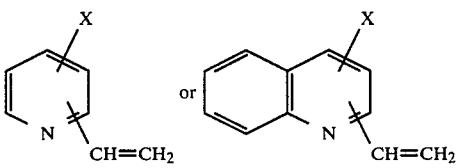

wherein X is a hydrogen atom, an alkyl group (which may be substituted, or a halogen atom.
(b) acrylic acid ester
(c) acrylonitrile
(5) Water-insoluble polymers in which the recurring unit represented by the general formula shown below constitutes at least 33⅓ mol%.

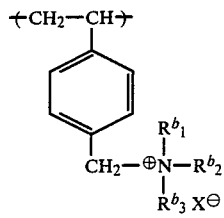

wherein:
$R^b_1$, $R^b_2$ and $R^b_3$ are each an alkyl group which may be substituted, provided that the total number of carbon atoms of $R^b_1$ to $R^b_3$ is at least 12; and
X is an anion.

Various known gelatins can be used in the mordanting layer. For example, lime-processed gelatin and acid-processed gelatin can be used. In addition, gelatins prepared by chemical modification of the above gelatins such as phthalation and sulphonylation can be used. If necessary, they can be used after a desalting treatment.

The mixing ratio of the polymer mordant to the gelatin, and the amount of the polymer mordant coated can be easily determined by one skilled in the art depending on the amount of the dye to be mordanted, the type and composition of the polymer mordant, and the image-forming process to be employed. Preferably the weight ratio of mordant to gelatin is from about 20:80 to 80:20 and the amount of the mordant coated is from about 0.5 to 8 g/m².

The dye-fixing layer (II) may have a white reflective layer. For example, a layer of titanium dioxide dispersed in gelatin can be provided on the mordant layer provided on the transparent support. This titanium dioxide layer is a white opaque layer and, thus, when the transferred color image is seen from the side of the transparent support, a reflected color image can be seen.

A typical fixing material as used herein is obtained by mixing a polymer containing an ammonium salt with gelatin and then coating the mixture on a transparent support.

To accelerate the transfer of dyes from the light-sensitive layer to the dye-fixing layer, dye transfer aids can be used.

If the dye transfer aid is externally supplied, such aids include water and basic aqueous solutions containing caustic soda, caustic potash or inorganic alkali metal salts, low boiling solvents such as methanol, N,N-dimethylformamide, acetone, and diisobutyl ketone, or mixtures of such low boiling solvents and water or basic aqueous solutions. These dye transfer aids may be used in a method in which the image-receiving layer is wetted with the transfer aid.

The transfer aid can be incorporated in the light-sensitive material or the dye-fixing material, rather than being externally supplied. The transfer aid may be incorporated in the material in the form of crystal water or microcapsules, or as precursors releasing the solvent at elevated temperatures. In a preferred embodiment, hydrophilic thermal solvents which are solid at ordinary temperature and dissolve at elevated temperatures are incorporated in the light-sensitive material or dye-fixing material. These hydrophilic thermal solvents may be added to either of the light-sensitive material and dye-fixing material, or to both the materials. They also may be added to any of the emulsion layer, the intermediate layer, the protective layer, and the dye-fixing layer. It is preferred for them to be added to the dye-fixing layer and/or a layer adjacent to the dye-fixing layer.

Examples of hydrophilic thermal solvents include ureas, pyridines, amides, sulfonamides, imides, alcohols, oximes, and other heterocyclic rings.

The present invention is described in greater detail with reference to the following examples, although the present invention is not to be construed as being limited thereto. Unless otherwise indicated, all parts, ratios and percents are by weight.

EXAMPLE 1

Preparation of a Silver Iodobromide Emulsion 40 g of gelatin and 26 g of potassium bromide (KBr) were dissolved in 3,000 ml of water, with stirring at 50° C. A solution of 34 g of silver nitrate dissolved in 200 ml of water was added to the above-prepared solution over 10 minutes at this temperature.

Then, a solution of 3.3 g of potassium iodide (KI) dissolved in 100 ml of water was added over 2 minutes.

The thus-prepared silver iodobromide emulsion was adjusted in pH, precipitated, and freed of excess salts. It was then adjusted to a pH 6.0 (yield, 400 g).

Preparation of Silver Benzotriazole Emulsion 28 g of gelatin and 13.2 g of benzotriazole were dissolved in 3,000 ml of water with stirring at 40° C. A solution of 17 g of silver nitrate dissolved in 100 ml of water was added to the above-prepared solution over 2 minutes, at this temperature.

The thus-prepared silver benzotriazole emulsion was adjusted in pH, precipitated, and freed of excess salts. It was then adjusted to a pH of 6.0 (yield, 400 g).

Preparation of a Gelatin Dispersion of the Dye-Providing Compound

To 5 g of the dye-providing compound (21) of the present invention synthesized as described in Preparation Example 4 above, 0.5 g of succinic acid 2-ethyl-hexyl ester sulfonic acid sodium salt, and 5 g of tricresyl phosphate (TCP) was added 30 ml of ethyl acetate, and this mixture was dissolved by heating at about 60° C. to prepare a uniform solution. This solution was added to 100 g of a 10% aqueous solution of gelatin and was dispersed therein for 10 minutes by means of a homogenizer at 10,000 rpm, to form a dispersion of the dye-providing compound (21).

Light-sensitive materials A and B were produced as follows.

| Light-Sensitive Material A | |
|---|---|
| (a) Silver iodobromide emulsion as prepared above | 25 g |
| (b) Dispersion of the dye-providing compound (22) | 33 g |
| (c) 2.5% Aqueous solution of a compound having the following formula: | 10 ml |

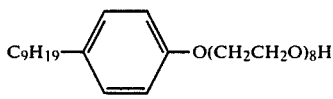

| (d) 10% Ethanol solution of guanidinetrichloroacetic acid | 15 ml |
| (e) 10% Ethanol solution of dimethyl sulfide | 4 ml |
| (f) 0.04% Methanol solution of a compound having the following formula: | |

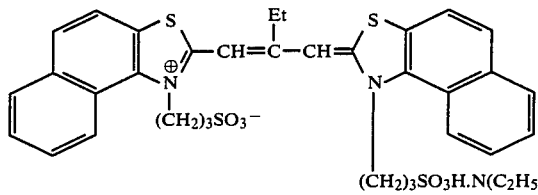

The above components (a) to (f) were mixed and dissolved, coated on a polyethylene terephthalate film in a wet layer thickness of 30 μm, and then dried. On the thus-formed layer, the following composition was coated in a wet layer thickness of 30 μm and dried to form a protective layer, whereupon the light-sensitive material A was obtained.

| | | |
|---|---|---|
| (a) | 10% Aqueous solution of gelatin | 30 g |
| (b) | 1% Aqueous solution of succinic acid 2-ethyl-hexyl ester sulfonic acid sodium salt | 5 ml |
| (c) | Water | 65 ml |
| | Light-Sensitive Material B | |
| (a) | Silver benzotriazole emulsion | 10 g |
| (b) | Silver iodobromide emulsion | 20 g |
| (c) | Dispersion of the dye-providing compound (21) | 33 g |
| (d) | 25% Aqueous solution of compound having the following formula: | 10 ml |

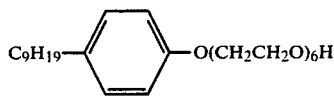

| (e) | 10% Ethanol solution of guanidinetrichloroacetic acid | 16 ml |
| (f) | 10% Aqueous solution of dimethylsulfamide | 4 ml |
| (g) | 0.04% Methanol solution of a compound having the following formula: | 2 ml |

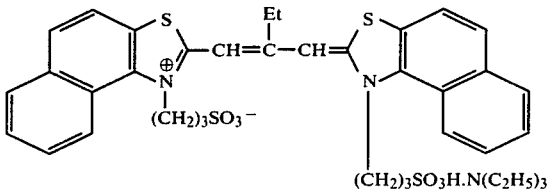

The above components (a) to (g) were mixed and dissolved, coated on a polyethylene terephthalate film in a wet layer thickness of 30 μm, and then dried. A protective layer was coated in the same manner as in the light-sensitive material (A).

For comparison, light-sensitive materials C and D were produced in the same manner as light-sensitive materials A and B except that the dye-providing compound (21) was replaced by a dye-providing compound having the following formula:

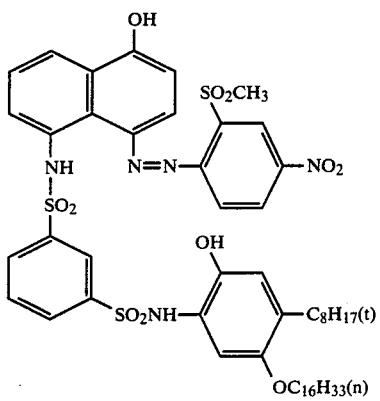

A dye-fixing material was produced as follows.

Dye-Fixing Material 10 g of a methyl acrylate/N,N,N-trimethyl-N-vinyl-benzylammonium chloride (1:1 by mol) copolymer was dissolved in 200 ml of water and then uniformly mixed with 100 g of 10% lime-processed gelatin to provide a mordanting layer. The resulting mixture was uniformly coated in a wet layer thickness of 90 μm on a paper support laminated with a polyethylene film with titanium dioxide dispersed therein. The thus-produced material was dried and then used as a dye-fixing material with a mordanting layer.

Light-sensitive materials A and B were each exposed imagewise for 10 seconds at 2,000 lux using a tungsten lamp and then uniformly heated for 20 seconds on a heat block maintained at 130° C.

The dye-fixing material was soaked in water and then superimposed on the above-heated light-sensitive materials in such a manner that their coated layers were in contact with each other.

After heating for 6 seconds on a heat block maintained at 80° C., the dye-fixing material was separated from the light-sensitive material, whereupon a negative cyan color image was obtained in the dye-fixing material.

The negative image was measured for its density for red light by means of a Macbeth reflective densitometer (RD-519). The results are shown in Table 1.

TABLE 1

| Light-Sensitive Material | Dye-Providing Compound No. | Maximum Density | Minimum Density |
|---|---|---|---|
| A | (21) | 2.05 | 0.11 |
| B | (21) | 2.23 | 0.12 |
| C | Comparative Compound | 1.95 | 0.11 |
| D | Comparative Compound | 2.16 | 0.13 |

It can be seen from the results in Table 1 that the dye-providing compound (21) of the present invention provides a high maximum density to the fogging density (minimum density).

Light-sensitive materials B and D were measured for relative red light sensitivity. The sensitivity of the light-sensitive material B containing the compound of the present invention was 350 and that of the comparative light-sensitive material D was 100. Thus, it can be seen that the dye-providing compound of the present invention shows very high sensitivity. Nearly the same results were obtained in comparison of the light-sensitive material A with the comparative light-sensitive material C.

A transparent film with an infrared absorption layer was superimposed on the coated layer of dye-fixing materials A and C with the negative image formed therein, and the color image was irradiated with xenon light (100,000 lux) for 1 day by the use of an Atlas C.I. 65 weatherometer. Before and after the irradiation with xenon light, the density of the color images was measured, and the fastness of the color image to light was evaluated. The ratio of dye remaining at a reflective density of 1.0 was measured, and the results are shown in Table 2.

TABLE 2

| Dye-Providing Compound No. | Ratio of Dye Remaining (%) |
|---|---|
| (21) | 54 |
| Comparative Compound | 31 |

It can be seen from the results shown in Table 2 that the compound of the present invention provides a color image considerably faster to light than that provided by the comparative dye-providing compound.

EXAMPLE 2

Light-sensitive materials E, F and G were produced in the same manner as light-sensitive material B of Example 1 except that dye-providing compounds (2), (5) and (20), respectively, were used in place of the dye-providing compound (21). These light-sensitive materials were processed in the same manner as in Example 1, and the results are shown in Table 3.

TABLE 3

| Light-Sensitive Material | Dye-Providing Compound No. | Maximum Density | Minimum Density | Relative Sensitivity |
|---|---|---|---|---|
| E | (2) | 1.99 | 0.09 | 300 |
| F | (5) | 1.88 | 0.08 | 300 |
| G | (20) | 2.28 | 0.12 | 350 |
| D | Comparative Compound | 2.16 | 0.13 | 100 |

A light fastness test was performed in the same manner as in Example 1, and the results are shown in Table 4.

TABLE 4

| Dye-Providing Compound No. | Ratio of Dye Remaining (%) |
|---|---|
| (2) | 53 |
| (5) | 60 |
| (20) | 57 |
| Comparative Compound | 31 |

It can be seen from the above results that the dye-providing compounds of the present invention provide sharp cyan color images and high sensitivity, the color images being sharp even after exposure to light.

EXAMPLE 3

The following layers were coated on a transparent polyethylene terephthalate film support in the order shown to produce a light-sensitive material.

(1) Mordanting layer containing 3.0 g/m² of a styrene/N-vinylbenzyl-N,N,N-trihexylammonium chloride copolymer and 3.0 g/m² of gelatin.

(2) Light-reflective layer containing 20 g/m² of titanium dioxide and 2.0 g/m² of gelatin.

(3) Light-shielding layer containing 3.0 g/m² of carbon black and 2.0 g/m² of gelatin.

(4) Layer containing 0.44 g/m² of cyan dye-providing compound, 0.09 g/m² of tricyclohexyl phosphate, and 0.8 g/m² of gelatin.

(5) Layer containing 1.03 g/m² (calculated as silver) of a red-sensitive internal latent image-type direct reversal silver bromide emulsion, 1.2 g/m² of gelatin, 0.05 mg/m² of a nucleating agent having the formula shown below, and 0.13 g/m² of a 2-sulfo-5-n-pentadecylhydroquinone.sodium salt.

(8) Layer containing 0.82 g/m² (calculated as silver) of a green-sensitive internal latent image-type direct reversal silver bromide emulsion, 0.9 g/m² of gelatin, 0.03 g/m² of the same nucleating agent as used in layer (5), and 0.08 g/m² of a 2-sulfo-5-n-pentadecylhydroquinone sodium salt.

(9) Same layer as layer (6).

(10) Layer containing 0.53 g/m² of a yellow dye-providing compound having the formula shown below, 0.13 g/m² of tricyclohexyl phosphate, and 0.7 g/m² of gelatin.

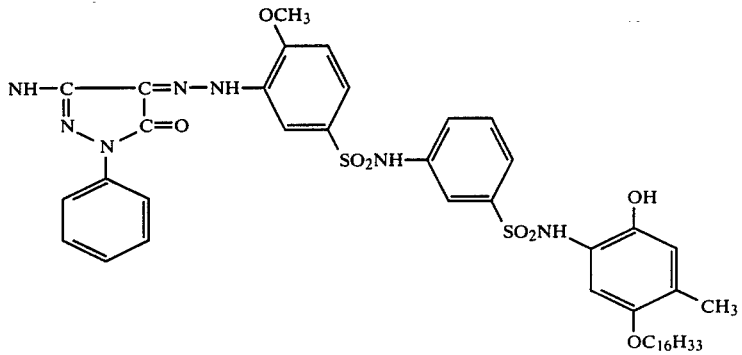

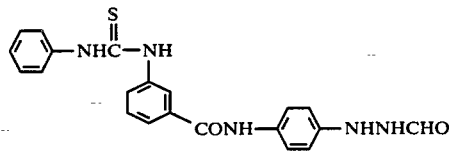

(6) Color mixing-preventing agent-containing layer containing 0.8 g/m² of gelatin, 1.0 g/m² of 2,5-di-tert-pentadecylhydroquinone, and 1.0 g/m² of polymethyl methacrylate.

(7) Layer containing 0.21 g/m² of a magenta dye-providing compound having the first formula shown below, 0.11 g/m² of a magenta dye-releasing redox compound having the second formula shown below, 0.08 g/m² of tricyclohexyl phosphate, and 0.9 g/m² of gelatin.

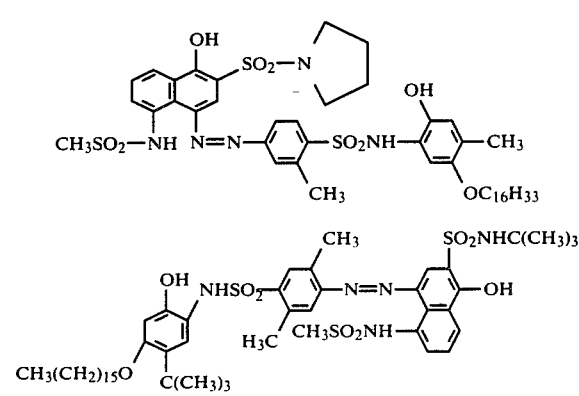

(11) Layer containing 1.09 g/m² (calculated as silver) of a blue-sensitive internal latent image-type direct reversal silver bromide emulsion, 1.1 g/m² of gelatin, 0.04 mg/m² of the same nucleating agent as used in layer (5), and 0.07 g/m² of a 2-sulfo-5-n-pentadecylhydroquinone sodium salt.

(12) Layer containing 1.0 g/m² of gelatin.

The following layers (1') to (3') were coated on a transparent polyester support in the order shown to produce a cover sheet.

(1') Layer containing 22 g/m² of an acrylic acid/butyl acrylate (80:20 by weight) copolymer, and 0.44 g/m² of 1,4-bis(2,3-epoxypropoxy)butane.

(2') Layer containing 3.8 g/m² of acetyl cellulose (degree of acetylation 39.4%), and 0.2 g/m² of a styrene/maleic anhydride (60:40 by weight) copolymer (molecular weight, about 50,000), and 0.115 g/m² of 5-($\beta$-cyanoethylthio)-1-phenyltetrazole.

(3') Layer containing 2.5 g/m² of a vinylidene chloride/methyl acrylate/acrylic acid (85:12:3 by weight) copolymer latex, and 0.05 g/m² of a polymethyl methacrylate latex (aprticle size, 1–3 μm).

A photographic film was prepared by laminating the light-sensitive material with the cover sheet. The photographic film was exposed imagewise through a continuous wedge to a 4,800° K. light obtained by passing a 2,854° K. tungsten light through a Debis-Gibbson filter. The maximum exposure was 10 C.M.S.

The exposed film was developed with the following developer.

| Processing Composition A | |
|---|---|
| 1-Phenyl-4-hydromethyl-4-methyl-3-pyrazolidone | 12 g |
| Methyl Hydroquinone | 0.3 g |
| 5-Methylbenzotriazole | 3.5 g |
| Sodium Sulfite (anhydrous) | 0.2 g |
| Carboxymethyl Cellulose Sodium Salt | 43 g |
| Potassium Hydroxide | 56 g |
| Benzyl Alcohol | 1.5 ml |
| Carbon Black | 150 g |

-continued

| Processing Composition A | |
|---|---|
| Water to make the total weight | 1,000 g |

One day after preparation, the above processing composition A was uniformly extended in a thickness of 80μ between the light-sensitive material and the cover sheet by passing it between a pair of rollers arranged in parallel and maintained at 25° C.

Cyan dye-providing compounds (5) and (20) were used, and as comparative compounds, the following compounds (a) and (b) were used.

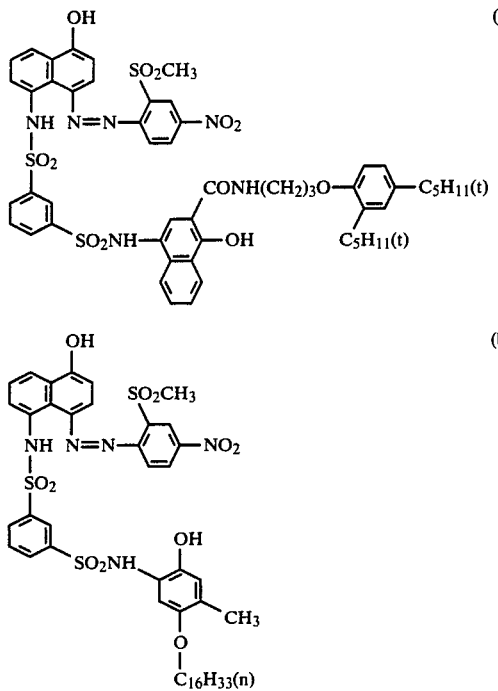

The maximum reflective cyan density was measured, and the results are shown in Table 5.

TABLE 5

| Dye-Providing Compound No. | Maximum Density |
|---|---|
| (5) | 2.00 |
| (20) | 2.32 |
| (a) (comparison) | 1.70 |
| (b) (comparison) | 1.78 |

It can be seen from the results shown in Table 5 that the dye-providing compounds of the present invention produce good images of high density.

The colored sheet was subjected to a light-fading test (17,000 lux, 14 days) by the use of a fluorescent fading testing machine, and the ratio of dye remaining, i.e., the ratio of the final dye density to the initial density was determined. The results are shown in Table 6.

TABLE 6

| Dye-Providing Compound No. | Ratio to Dye Remaining |
|---|---|
| (2) | 90 |
| (20) | 88 |
| (a) | 60 |

TABLE 6-continued

| Dye-Providing Compound No. | Ratio to Dye Remaining |
|---|---|
| (b) | 60 |

The colored sheet was dried at 40° C. for 2 weeks and then was subjected to the same light-fading test as above. The results are shown in Table 7.

TABLE 7

| Dye-Providing Compound No. | Ratio of Dye Remaining |
|---|---|
| (2) | 63 |
| (20) | 60 |
| (a) | 35 |
| (b) | 35 |

It can be seen that the images obtained using the compounds of the present invention are remarkably light-fast as compared with the comparative compounds, even if exposed to light for long periods of time.

EXAMPLE 4

An image-receiving material was produced by a different procedure from that in Example 1.

10 g of a methyl acrylate/N,N,N-trimethyl-N-vinyl-benzylammonium chloride (1:1) copolymer was dissolved in 200 ml of water and the resulting solution was uniformly mixed with 100 g of 10% lime-processed gelatin. The resulting mixture was coated in a wet film thickness of 90μ on a polyethylene terephthalate film support with titanium dioxide dispersed therein.

The following compounds (j) to (o) were mixed and dissolved and were then uniformly coated in a wet film layer of 60 μm on the above-coated layer and then dried, to form a hydrophilic thermal solvent layer.

| | | |
|---|---|---|
| (j) | Urea (hydrophilic heat solvent) | 2 g |
| (k) | N—Methylurea | 2 g |
| (l) | Water | 8 ml |
| (m) | 10% by weight aqueous solution of polyvinyl alcohol (degree of saponification, 98%) | 12 g |
| (n) | 5% Aqueous solution of a compound having the following formula: | 2 ml |

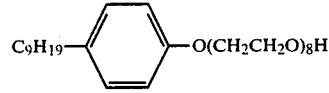

| | | |
|---|---|---|
| (o) | 5% Aqueous solution of sodium dodecylbenzenesulfonate | 0.5 ml |

The thus-produced material was dried and then used as a dye-fixing material.

As the light-sensitive material, the light-sensitive materials B and D of Example 1 were used. These light-sensitive materials were exposed imagewise for 10 seconds at 2,000 lux by the use of a tungsten light bulb. Then, they were uniformly heated for 20 seconds on a heat block maintained at 130° C.

The heated light-sensitive material was superimposed on the dye-fixing material in such a manner that the coated layers were in contact with each other. This superimposed member was passed through a pair of rollers arranged in parallel and maintaned at 130° C. and heated for 40 seconds while pressing. When the dye-fixing material was stripped from the light-sensitive material, a positive cyan color image was obtained on the dye-fixing material, corresponding to the silver image. The red density of the negative image was measured using a Macbeth reflective densitometer (RD-519). The results are shown in Table 7.

TABLE 7

| Dye-Providing Compound No. | Maximum Density | Relative Red Light Sensitivity |
|---|---|---|
| (21) | 2.10 | 360 |
| Comparative Compound | 2.03 | 100 |

The fastness of the color image was tested in the same manner as in Example 1. The results are shown in Table 8.

TABLE 8

| Dye-Providing Compound No. | Ratio of Dye Remaining (%) |
|---|---|
| (21) | 57 |
| Comparative Compound | 28 |

The above results demonstrate that the dye-providing compound of the present invention provides a sharp image which is stable when exposed to light, when the dye-fixing material of this example is employed.

While the invention has been described in detail and with reference to specific embodiments thereof, it will be apparent to one skilled in the art that various changes and modifications can be made therein without departing from the spirit and scope thereof.

What is claimed is:

1. A color light-sensitive material comprising a support and at least one light-sensitive silver salt layer on the support, said layer containing a dye-providing compound represented by the following general formula (I):

(Dye-X)$_q$-Y     (I)

wherein Dye is a cyan dye group or dye precursor represented by general formula (II);

X is a bonding or connecting group;

Y is a group which releases Dye in a positive or negative relation to a latent image imagewise formed in a light-sensitive silver salt, the diffusibility of the Dye released being different from that of the compound of the general formula (I);

q is 1 or 2, and when q is 2, (Dye-X) may be the same or different; and

Dye is linked to X through any one of A, $B^1$, $B^2$, $B^3$, $B^4$, $B^5$, E, G and J of general formula (II):

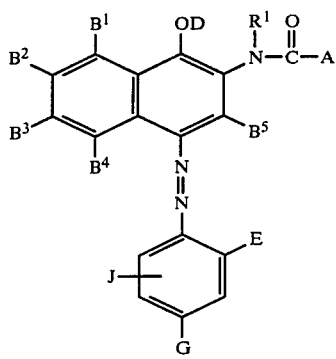

(II)

wherein A is a bond, a hydrogen atom, an alkyl group, a substituted alkyl group, an aryl group, a substituted aryl group, a heterocyclic group, or

wherein $A^2$ and $A^3$ may be the same or different and are each the same as defined for A;

$B^1$, $B^2$, $B^3$, $B^4$ and $B^5$ may be the same or different, and are each a bond, or a hydrogen atom, an alkyl group, a substituted alkyl group, a halogen atom,

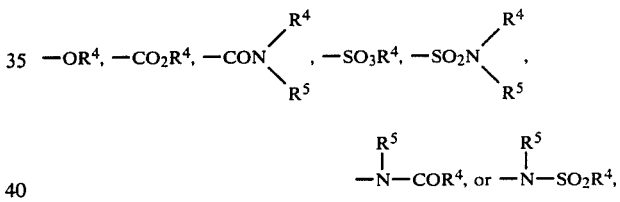

wherein $R^4$ and $R^5$ may be the same or different, and are each a hydrogen atom, an alkyl group, a substituted alkyl group, an aryl group, or a substituted aryl group; $R^4$ and $R^5$ may combine together to form a 5- or 6-membered ring;

D is a hydrogen atom or a group capable of reacting to form an O$^-$ ion which is released under the action of a nucleophilic agent;

E and G may be the same or different and are each a bond, an alkylsulfonyl group, a substituted alkylsulfonyl group, a phenylsulfonyl group, a substituted phenylsulfonyl group, or a cyano group, wherein the substituent or substituents are selected from the group consisting of

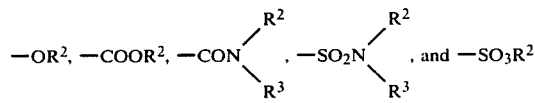

wherein $R^2$ and $R^3$ are each a hydrogen atom, an alkyl group, or an aryl group;

J is a hydrogen atom, a halogen atom, or a cyano group; and $R^1$ is a hydrogen atom, an alkyl group, or a substituted alkyl group.

2. The color light-sensitive material claimed in claim 1, wherein connecting group X is selected from the group consisting of —NR$^6$— wherein R$^6$ is a hydrogen atom, an alkyl group, or a substituted alkyl group, —SO$_2$—, —CO—, an alkylene group, a substituted alkylene group, a phenylene group, a substituted phenylene group, a naphthylene group, a substituted naphthylene group, —O—, —SO— or a combination of two or more of these groups.

3. The color light-sensitive material claimed in claim 2, wherein connecting group X is selected from the group consisting of —NR$^6$—SO$_2$—, —NR$^6$—CO—, R$^7$—(L)$_k$—(R$^8$)$_l$—, wherein R$^7$ and R$^8$, which may be the same or different, are selected from the group consisting of an alkylene group, a substituted alkylene group, a phenylene group, a substituted phenylene group, a naphthylene group, and a substituted naphthylene group; L is selected from the group consisting of —O—, —CO—, —SO—, —SO$_2$—, —SO$_2$NH—, —NHSO$_2$—, —CONH—, and —NHCO—; k is 0 or 1; and l is when k equals 1 and 1 or 0 when k equals 0.

4. The color light-sensitive material claimed in claim 1, wherein dye is represented by the following general formulae (IA) and (IB):

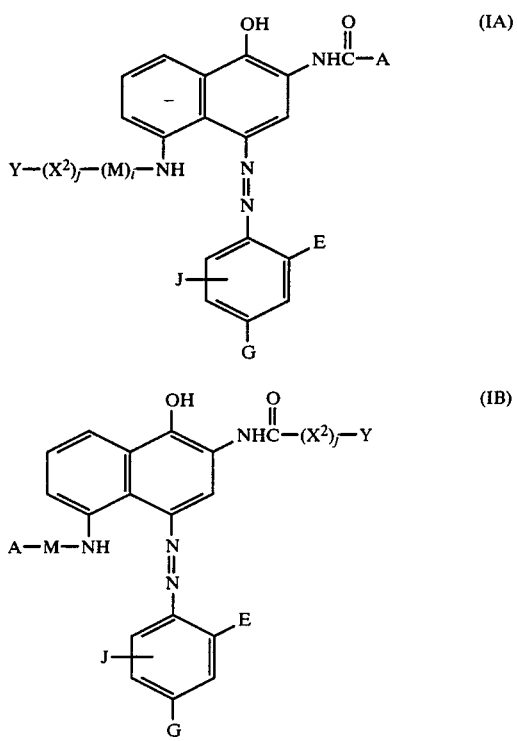

wherein M is —SO$_2$— or —CO—; X$^2$ is —R$^3$—(L-)$_k$—(R$^4$)$_l$— wherein Y, A, E, J, G, R$^3$ and R$^4$ are the same as defined in claim 1; i and j are each 0 or 1; L is selected from the group consisting of —O—, —CO—, —SO—, —SO$_2$—, —SO$_2$NH—, NHSO$_2$—, —CONH—, and —NHCO—; k is 0 or 1; and l is 1 when k equals 1 and 1 or 0 when k equals 0.

5. The color light-sensitive material claimed in claim 1, wherein Y is selected from the group consisting of an N-substituted sulfamoyl group represented by general formula (III):

wherein Ball is a ballast group; β is a non-metallic atomic group necessary for forming a benzene ring, α is —OG$^{11}$ or —NHG$^{12}$, wherein G$^{11}$ is a hydrogen atom or a group forming a hydroxyl group upon hydrolysis and G$^{12}$ is a hydrogen atom, an alkyl group having from 1 to 22 carbon atoms, or a hydrolyzable group; and b is 0 or an integer of 1, or 2 when α is —NHG$^{12}$ and G$^{12}$ is an alkyl group which makes the compound of general formula (III) immobile and nondiffusing and b is 1 or 2 when α is —OG$^{11}$ or —NHG$^{12}$ and G$^{12}$ is a hydrogen atom, an alkyl group having from 1 to 8 carbon atoms, or a hydrolyzable group.

6. The color light-sensitive material claimed in claim 1, wherein Y is represented by formula (IV):

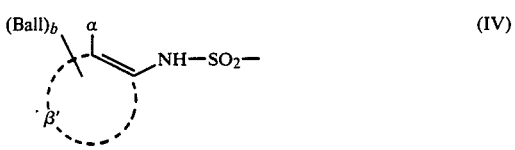

wherein β' is atomic group necessary for forming a carbon ring; Ball is a ballast group; α is —OG$^{11}$ or —NHG$^{12}$, wherein G$^{11}$ is a hydrogen atom or a group forming a hydroxyl group upon hydrolysis and G$^{12}$ is a hydrogen atom, an alkyl group having from 1 to 22 carbon atoms, or a hydrolyzable group; and b is 0 or an integer of 1, or 2 when α is —NHG$^{12}$ and G$^{12}$ is an alkyl group which makes the compound or general formula (IV) immobile and nondiffusing and b is 1 or 2 when α is —OG$^{11}$ or —NHG$^{12}$ and G$^{12}$ is a hydrogen atom, an alkyl group having from 1 to 8 carbon atoms, or a hydrolyzable group.

7. The color light-sensitive material claimed in claim 1, wherein Y is represented by general formula (V):

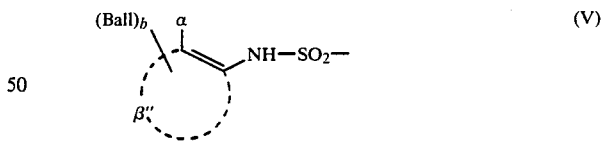

wherein β" is atomic group necessary for forming a hetero ring, which may be condensed with a carbon ring or a hetero ring; Ball is a ballast group; α is —OG$^{11}$ or —NHG$^{12}$, wherein G$^{11}$ is a hydrogen atom or a group forming a hydroxyl group upon hydrolysis and G$^{12}$ is a hydrogen atom, an alkyl group having from 1 to 22 carbon atoms, or a hydrolyzable group; and b is 0 or an integer of 1, or 2 when α is —NHG$^{12}$ and G$^{12}$ is an alkyl group which makes the compound of general formula (V) immobile and nondiffusing and b is 1 or 2 when α is —OG$^{11}$ or —NHG$^{12}$ and G$^{12}$ is a hydrogen atom, an alkyl group having from 1 to 8 carbon atoms, or a hydrolyzable group.

8. The color light-sensitive material claimed in claim 1, wherein Y is represented by general formula (IV):

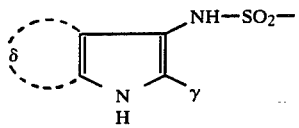

wherein γ is selected from the group consisting of a hydrogen atom, a substituted or unsubstituted alkyl group, a substituted or unsubstituted aryl group, a substituted or unsubstituted heterocyclic group, and —CO—$G^{21}$, wherein $G^{21}$ is selected from the group consisting of

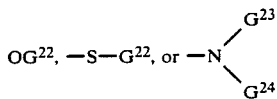

$G^{22}$ is selected from the group consisting of a hydrogen atom, a substituted or unsubstituted alkyl group, a substituted or unsubstituted cycloalkyl group, or a substituted or unsubstituted aryl group, $G^{23}$ is the same as $G^{22}$ or is an acyl group derived from an aliphatic or aromatic carboxylic acid or sulfonic acid, and $G^{24}$ is a hydrogen atom or a substituted or unsubstituted alkyl group; and δ is an atomic group necessary for completing the condensed benzene ring which may be further substituted, and a substituent of the condensed benzene ring is a ballast group or contains a ballast group.

9. The color light-sensitive material claimed in claim 1, wherein Y is represented by general formula (VII):

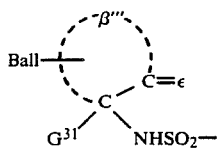

wherein Ball is a ballast group ε is an oxygen atom or =N$G^{32}$, wherein $G^{32}$ is a hydroxyl group or a substituted or unsubstituted amino group; β''' is a 5-, 6- or 7-membered non-aromatic hydrocarbon ring, which may be saturated or unsaturated and which may be fused with a second ring to form a condensed ring system; $G^{31}$ is a hydrogen atom or a halogen atom.

10. The color light-sensitive material claimed in claim 1, wherein Y is represented by general formula (VIII):

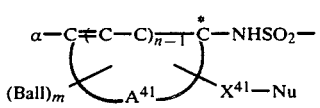

wherein α is OR$^{41}$ or NHR$^{42}$, wherein R$^{41}$ is a hydrogen atom or a hydrolyzable group and R$^{42}$ is a hydrogen atom or an alkyl group having from 1 to 50 carbon atoms; A$^{41}$ is an atomic group necessary for forming an aromatic ring; Ball is an organic immobilizing group; m is an integer of 1 or 2, provided that when m is 2, Ball may be the same or different; X$^{41}$ is a divalent organic group having from 1 to 8 atoms which forms a 5- to 12-membered ring in combination with electrophilic center carbon * by oxidation with nucleophilic group; Nu is a nucleophilic group; n is an integer of 1 or 2; and α is —O$G^{11}$ or —NH$G^{12}$, wherein $G^{11}$ is a hydrogen atom or a group forming a hydroxyl group upon hydrolysis and $G^{12}$ is a hydrogen atom, an alkyl group having from 1 to 22 carbon atoms, or a hydrolyzable group.

11. The color light-sensitive material claimed in claim 1, wherein Y is represented by general formula (IX):

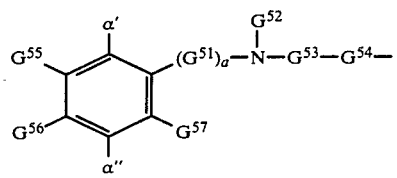

wherein α' is an oxidizable nucleophilic group selected from the group consisting of a hydroxyl group, a primary or secondary amino group, a hydroxyamino group and a sulfonamido group or precursors thereof, α'' is a dialkylamino group or any one of the groups as defined for α', $G^{53}$ is an electrophilic group, $G^{54}$ is selected from the group consisting of an oxygen atom, a sulfur atom, a selenium atom and a nitrogen atom, $G^{51}$ is an alkylene group having from 1 to 3 carbon atoms, a is 0 or 1, $G^{52}$ is a substituted or unsubstituted alkyl group having from 1 to 40 carbon atoms or a substituted or unsubstituted aryl group having from 6 to 40 carbon atoms, $G^{55}$, $G^{56}$ and $G^{57}$, which may be the same or different, are selected from the group consisting of a halogen atom, a carbonyl group, a sulfamyl group, a sulfonamido group, an alkyloxy group having from 1 to 40 atoms, a substituted or unsubstituted alkyl group having from 1 to 40 carbon atoms, and a substituted or unsubstituted aryl group having from 6 to 40 carbon atoms, provided that $G^{55}$ and $G^{56}$ may combine to form a 5- or 7-membered ring, $G^{56}$ may be

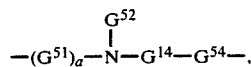

and at least one of $G^{52}$, $G^{55}$, $G^{56}$ and $G^{57}$ is a ballast group.

12. The color light-sensitive material claimed in claim 1, wherein Y is represented by the following general formulae (XA) and (XB):

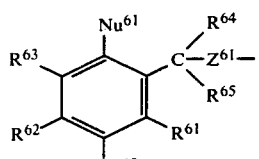

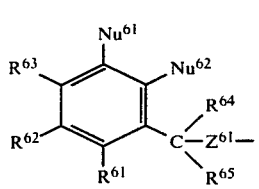

wherein Nu$^{61}$ and Nu$^{62}$ may be the same or different and each is a nucleophilic group or its precursor; Z$^{61}$ is a divalent atomic group which is electrically negative to the carbon atom at which R$^{64}$ and R$^{65}$ are substituted; R$^{61}$, R$^{62}$ and R$^{63}$, which may be the same or different, are selected from the group consisting of a hydrogen atom, a halogen atom, an alkyl group, an alkoxy group, and an acylamino group, provided that $R^{61}$ and $R^{62}$ when adjacent on the ring, may form a condensed ring, and $R^{62}$ and $R^{63}$ when adjacent on the ring, may form a condensed ring; $R^{64}$ and $R^{65}$, which may be the same or different, are selected from the group consisting of a hydrogen atom, a hydrocarbon group, and a substituted hydrocarbon group; and a sufficiently large ballast group to make the compound immobile is present in at least one of $R^{61}$, $R^{62}$, $R^{63}$, $R^{64}$ or $R^{65}$.

13. The color light-sensitive material claimed in claim 1, wherein Y is represented by general formula (XI):

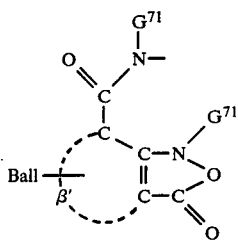

(XI)

wherein $G^{71}$ is a substituted or unsubstituted alkyl group; Ball is a ballast group; and $\beta'$ is atomic group necessary for forming a carbon ring.

14. The color light-sensitive material claimed in claim 1, wherein Y is represented by general formula (XII):

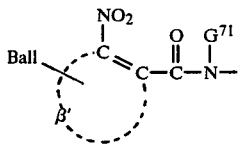

(XII)

wherein $G^{71}$ is a substituted or unsubstituted alkyl group; Ball is a ballast group; and $\beta'$ is atomic group necessary for forming a carbon ring.

15. The color light-sensitive material claimed in claim 1, wherein Y is represented by general formula (XIII):

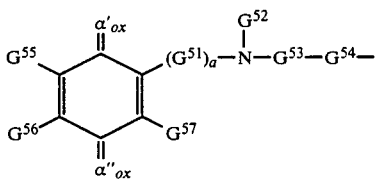

(XIII)

wherein $\alpha'_{ox}$ and $\alpha''_{ox}$ are groups capable of releasing $\alpha'$ and $\alpha''$, respectively, upon reduction; $\alpha'$ is an oxidizable nucleophilic group selected from the group consisting of a hydroxyl group, a primary or secondary amino group, a hydroxyamino group and a sulfonamido group or precursors thereof; $\alpha''$ is a dialkylamino group or any one of the groups as defined for $\alpha'$; $G^{51}$ is an alkylene group having from 1 to 3 carbon atoms; $G^{52}$ is a substituted or unsubstituted alkyl group having from 1 to 40 carbon atoms or a substituted or unsubstituted aryl group having from 6 to 40 carbon atoms; $G^{53}$ is an electrophilic group; $G^{54}$ is selected from the group consisting of an oxygen atom, a sulfur atom, a selenium atom and a nitrogen atom; $G^{55}$, $G^{56}$ and $G^{57}$, which may be the same or different, are selected from the group consisting of a halogen atom, a carbonyl group, a sulfamyl group, a sulfonamido group, an alkyloxy group having from 1 to 40 atoms, a substituted or unsubstituted alkyl group having from 1 to 40 carbon atoms, and a substituted or unsubstituted aryl group having from 6 to 40 carbon atoms, provided that $G^{55}$ and $G^{56}$ may combine to form a 5- or 7-membered ring, $G^{56}$ may be

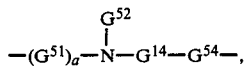

and at least one of $G^{52}$, $G^{55}$, $G^{56}$ and $G^{57}$ is a ballast group; and a is 0 or 1.

16. The color light-sensitive material claimed in claim 1, wherein Y is represented by general formulae (XIVA) and (XIVB):

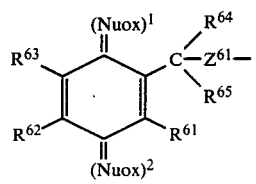

(XIVA)

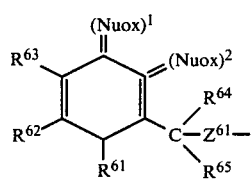

(XIVB)

wherein (Nuox)¹ and (Nuox)² may be the same or different and are oxidized nucleophilic groups; $Z^{61}$ is a divalent atomic group which is electrically negative to the carbon atom at which $R^{64}$ and $R^{65}$ are substituted; $R^{61}$, $R^{62}$ and $R^{63}$, which may be the same or different, are selected from the group consisting of a hydrogen atom, a halogen atom, an alkyl group, an alkoxyl group, and an acylamino group, provided that $R^{61}$ and $R^{62}$ when adjacent on the ring, may form a condensed ring, and $R^{62}$ and $R^{63}$ when adjacent on the ring, may form a condensed ring; $R^{64}$ and $R^{65}$, which may be the same or different, are selected from the group consisting of a hydrogen atom, a hydrocarbon group, and a substituted hydrocarbon group; and a sufficiently large ballast group to make the compound immobile is present in at least one of $R^{61}$, $R^{62}$, $R^{63}$, $R^{64}$ or $R^{65}$.

17. The color light-sensitive material claimed in claim 1, wherein Y is represented by general formula (XV):

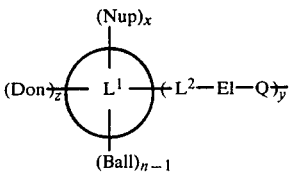

(XV)

wherein n, x, y and z are each 1 or 2, Don is an electron donor or an electron donor precursor, $L^1$ is an organic group connecting Nup to —El—Q or Don, Nup is a nucleophilic group precursor, El is an electrophilic center, Q is a divalent group, Ball is a ballast group, and $L^2$ is a connecting group.

18. The color light-sensitive material claimed in claim 1, wherein said material contains at least one red-sensitive silver halide emulsion layer containing a cyan dye-providing compound, at least one green-sensitive silver halide emulsion layer containing a magenta dye-providing compound and at least one blue-sensitive silver halide emulsion layer containing a yellow dye-providing compound.

* * * * *